US010901077B1

(12) United States Patent
LeGrand, III et al.

(10) Patent No.: US 10,901,077 B1
(45) Date of Patent: *Jan. 26, 2021

(54) AIRFRAME-EMBEDDED ULTRASONIC TRANSDUCERS

(71) Applicant: Amazon Technologies, Inc., Seattle, WA (US)

(72) Inventors: Louis Leroi LeGrand, III, Seattle, WA (US); Gershon Parent, Seattle, WA (US); Scott Michael Wilcox, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 231 days.

This patent is subject to a terminal disclaimer.

(21) Appl. No.: 16/155,768

(22) Filed: Oct. 9, 2018

Related U.S. Application Data

(63) Continuation of application No. 15/368,532, filed on Dec. 2, 2016, now Pat. No. 10,101,443.

(51) Int. Cl.

| | |
|---|---|
| ***G05D 1/00*** | (2006.01) |
| ***G01C 5/00*** | (2006.01) |
| ***B64C 39/04*** | (2006.01) |
| ***B64D 43/02*** | (2006.01) |
| ***B64C 13/16*** | (2006.01) |
| ***G05D 3/00*** | (2006.01) |
| ***G01H 5/00*** | (2006.01) |
| ***G01S 11/00*** | (2006.01) |

(Continued)

(52) U.S. Cl.
CPC .............. *G01S 11/14* (2013.01); *B64C 13/16* (2013.01); *B64C 39/024* (2013.01); *G05D 3/00* (2013.01); *B64C 2201/027* (2013.01); *B64C 2201/108* (2013.01)

(58) Field of Classification Search
CPC ........ B64D 43/00; B64D 43/02; B64C 13/00; B64C 13/16; B64C 39/024; G01H 5/00; G05D 1/00; G05D 1/0858; G01S 11/00; G01S 11/14
See application file for complete search history.

(56) References Cited

U.S. PATENT DOCUMENTS 4,112,756 A 9/1978 MacLennan et al.
4,890,488 A 1/1990 Pincent et al.
5,343,744 A 9/1994 Ammann (Continued)

*Primary Examiner* — Yonel Beaulieu
(74) *Attorney, Agent, or Firm* — Athorus, PLLC

(57) ABSTRACT

Aerial vehicles may be outfitted with one or more ultrasonic anemometers, each having ultrasonic transducers embedded into external surfaces. The transducers may be aligned and configured to transmit acoustic signals to one another, and receive acoustic signals from one another, along one or more paths or axes. Elapsed times of signals transmitted and received by pairs of transducers may be used to determine air speeds along the paths or axes. Where two or more pairs of transducers are provided, a net vector may be derived based on air speeds determined along the paths or axes between the pairs of the transducers, and used to generate control signals for maintaining the aerial vehicle on a desired course, at a desired speed or altitude, or in a desired orientation. The transducers may be dedicated for use in an anemometer, or may serve multiple purposes, and may be reoriented or reconfigured as necessary.

20 Claims, 22 Drawing Sheets

(51) Int. Cl.
*G01S 11/14* (2006.01)
*B64C 39/02* (2006.01)

(56) References Cited

U.S. PATENT DOCUMENTS

| | | | | |
|---|---|---|---|---|
| 5,877,416 | A | 3/1999 | Kapartis | |
| 10,101,443 | B1 * | 10/2018 | LeGrand, III ......... | B64D 43/02 |
| 2017/0313332 | A1 | 11/2017 | Paget et al. | |
| 2019/0154439 | A1 * | 5/2019 | Binder .................... | G01S 15/08 |

* cited by examiner $$V_1 = \left(\frac{L_1}{2}\right)\left(\frac{1}{\Delta t_3} - \frac{1}{\Delta t_1}\right)$$

$$V_2 = \left(\frac{L_2}{2}\right)\left(\frac{1}{\Delta t_4} - \frac{1}{\Delta t_2}\right)$$

$$\vec{V} = \vec{V}_X + \vec{V}_Y + \vec{V}_Z$$

AIRFRAME-EMBEDDED ULTRASONIC TRANSDUCERS

CROSS-REFERENCE TO RELATED APPLICATIONS

This application is a continuation of U.S. patent application Ser. No. 15/368,532, now U.S. Pat. No. 10,101,443, filed Dec. 2, 2016, the contents of which are incorporated by reference herein in their entirety.

BACKGROUND

The operation of an aerial vehicle (e.g., a manned or unmanned vehicle such as an airplane, a helicopter, a dirigible or another airship) is dependent upon a combination of four forces, namely, thrust, drag, weight and lift, the net effects of which may determine an extent and a direction of a velocity of the aerial vehicle. Thrust is a force that is typically generated by one or more aerial propulsors or propulsion units such as rotating bladed propellers or jet engines. Thrust may have a magnitude defined by one or more operating characteristics of the propulsor, e.g., a rotating speed, a number of blades, or sizes of blades of a propeller, or an amount or speed of exhaust expelled from a jet engine, as well as a direction defined by an orientation of the propulsor with respect to an airframe of an aerial vehicle. Thrust is necessary in order to overcome drag, which is a resistive aerodynamic force that is directed in an opposite direction to a direction of travel of the aerial vehicle, due to air that opposes the forward motion of the aerial vehicle. Weight is a force resulting from the Earth's gravitational pull acting on a center of mass of the aerial vehicle, in a vertical direction toward the Earth's center. Lift is another aerodynamic force that is generated by propellers, or from flows of air over wings or other control surfaces. Lift counteracts the effects of weight on an aerial vehicle, at least in part. Thrust, drag, weight and lift acting on an aerial vehicle must be placed in balance in order to ensure that the aerial vehicle operates at a desired and safe velocity.

With the exception of weight, each of the forces acting on an operating aerial vehicle may be affected by wind passing above, below or around the aerial vehicle. Wind may include a number of components that impact an amount of lift generated by a fixed or rotating wing on an aerial vehicle, as well as an extent of thrust or drag applied to the aerial vehicle. For example, a headwind is wind blowing on a front of an aerial vehicle, opposite to its direction of travel, while a tailwind is wind that blows from behind an aerial vehicle, in its direction of travel. Meanwhile, a crosswind is wind that blows laterally into an aerial vehicle, parallel to ground below the aerial vehicle and perpendicular to its direction of travel. Updrafts and downdrafts are winds that blow perpendicular to the ground and originate above or below an aerial vehicle, respectively. Wind that contacts an aerial vehicle typically includes one or more components (e.g., headwinds, tailwinds, crosswinds, updrafts or downdrafts) that impart forces on the aerial vehicle from a number of different directions.

The ability to determine air velocities is particularly advantageous for the safe operation of an aerial vehicle. The presence of air flow above, below or around an aerial vehicle may impact the aerial vehicle's ability to complete a mission or, in many cases, to remain aloft. Currently, wind speeds or directions may be determined in a number of ways. For example, a wind speed may be determined based on visual cues, such as according to the Beaufort scale, which is used to label winds with numbers (e.g., 0 to 12), descriptors such as "calm," "gale," or "storm force" depending on qualitative factors such as the visible effects of wind on trees, structures or bodies of water. A wind direction may be determined using a wind sock or a weathervane, which may realign itself in the presence of wind in order to minimize resistance. Additionally, an aerial vehicle may be equipped with a Pitot tube, which is an instrument that is used to determine air speeds based on static and dynamic pressures, and volumetric flow of an air stream passing through the tube. Depending on its size, an aerial vehicle may be outfitted with several Pitot tubes, which may be operated singly or in parallel to estimate air speeds in or around the aerial vehicle.

Pitot tubes are most effective at determining air speeds of an aerial vehicle when the aerial vehicle is traveling at high speeds. For example, in some jumbo jets that are configured for travel at speeds of hundreds of miles per hour, Pitot tubes may be provided in pairs and used to estimate air speeds. Pitot tubes are less effective, however, at determining air speeds when an aerial vehicle is traveling at low speeds. For this reason, Pitot tubes are not commonly used to determine speeds of wind passing above, below or around aerial vehicles that are configured to operate in a hovering flight mode, such as helicopters or many unmanned aerial vehicles (or UAVs or drones). The need to determine velocities of air and/or wind is particularly acute when aerial vehicles are operating in a hovering flight mode, as wind acting on an aerial vehicle that is traveling at low speeds or is hovering may easily upset a balance between thrust, drag, weight and lift forces acting on the aerial vehicle.

DETAILED DESCRIPTION

Figure 1A:
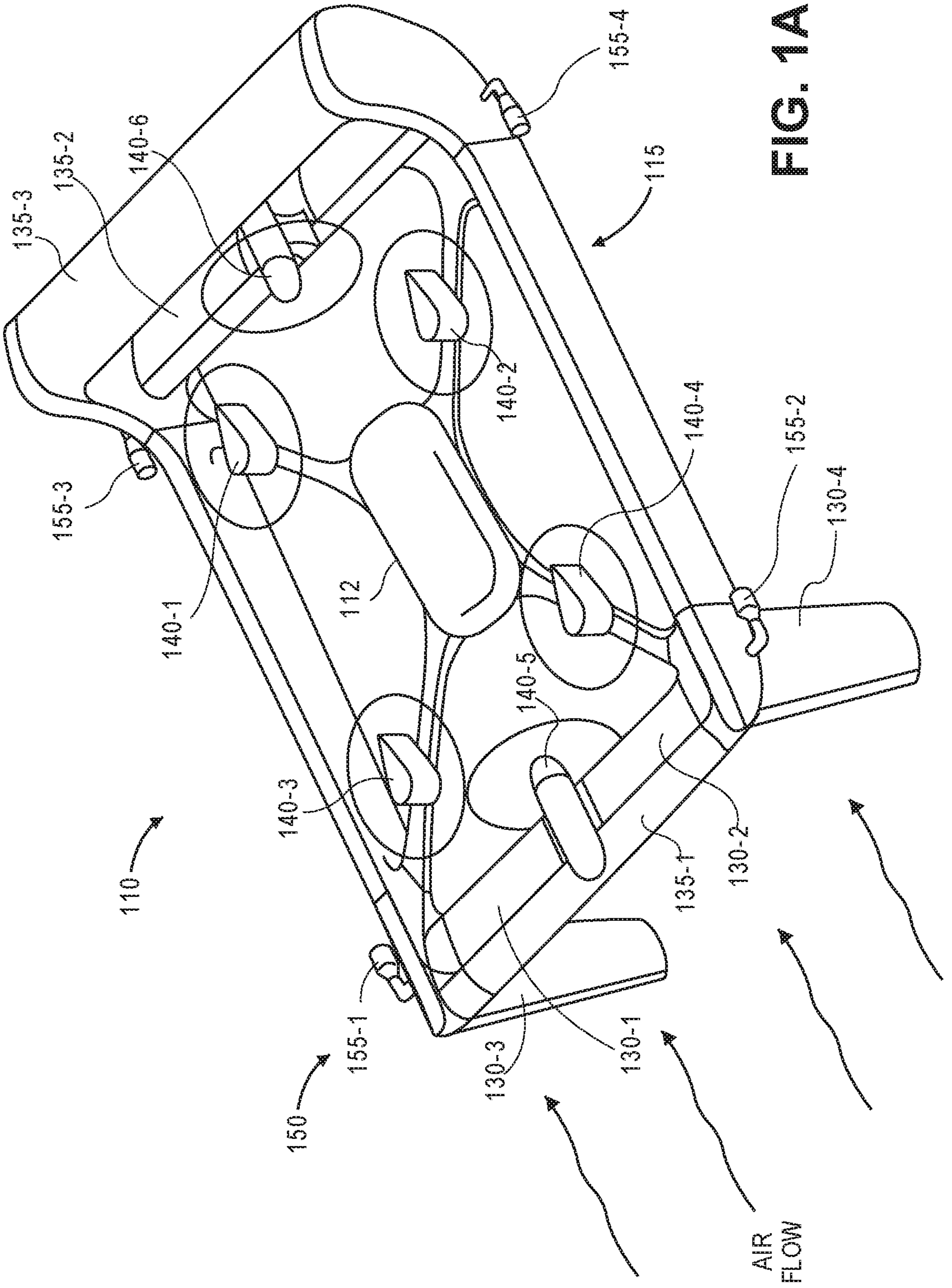
FIGS. 1A through 1C are views of an aerial vehicle having an airframe with an ultrasonic anemometer embedded therein in accordance with embodiments of the present disclosure.

As is set forth in greater detail below, the present disclosure is directed to aerial vehicles having ultrasonic transducers provided on external surfaces of airframes or other aspects of the aerial vehicle. More specifically, the present disclosure describes ultrasonic anemometers having one or more ultrasonic transducers that are configured to determine velocities of an aerial vehicle (viz., both speeds and directions), or of wind passing above, below or around the aerial vehicle. The ultrasonic anemometers may include a plurality of transducers that are configured to transmit acoustic energy (e.g., signals comprising beams or pulses, or bursts of such beams or pulses) in a number of modes. In one mode, the ultrasonic transducers may transmit acoustic energy toward one another, and to receive acoustic energy from one another, in accordance with a predetermined sampling pattern, sequence or schedule. For example, acoustic signals may be transmitted within predetermined frequency spectra (or bands), at predetermined intensity levels, for predetermined durations, or at predetermined times. Differences in times of flight of the respective beams traveling on common paths or axes between any pair of transducers may be used to determine velocities of air flowing above, below or around the aerial vehicle. The velocities may be used to determine an air speed of the aerial vehicle, e.g., a velocity of the aerial vehicle with respect to the air, including component parts of the air speed in orthogonal directions, or to exercise a level of control over the aerial vehicle, such as by manipulating one or more propulsion units or control surfaces to cause the aerial vehicle to maintain at a desired altitude, ground speed, or orientation about its principal axes (e.g., yaw, pitch and/or roll angle), namely, a longitudinal axis of the aerial vehicle, a lateral horizontal axis of the aerial vehicle, or a vertical axis of the aerial vehicle.

Additionally, because an air velocity of an aerial vehicle is a vector sum of a wind velocity and a ground velocity, an air velocity also be used, along with a ground velocity determined from any number of sources (e.g., Global Positioning System, or GPS, receivers or any inertial navigation sources), to determine the wind velocity within a vicinity of an aerial vehicle. The transducers of the present disclosure may be operated individually or in concert with one another, and may be mounted to surfaces of an airframe or other aspects of an aerial vehicle in alignments that enable such transducers to selectively transmit and receive acoustic energy to or from one or more other transducers, and to generate vectors representative of velocities accordingly. The transducers may be dedicated for use as anemometers, or may have multiple purposes or functions, with the determination of an air speed along a given axis according to anemometry being just one or more of such purposes or functions. For example, where an aerial vehicle is equipped with transducers for depth ranging, object recognition or collision avoidance, such transducers may be reconfigured for use in determining air speeds, e.g., by rotating, angling, twisting or otherwise reorienting such transducers into coaxial alignment with one another, and transmitting and receiving acoustic signals or energy in accordance with the present disclosure.

Figure 1B:
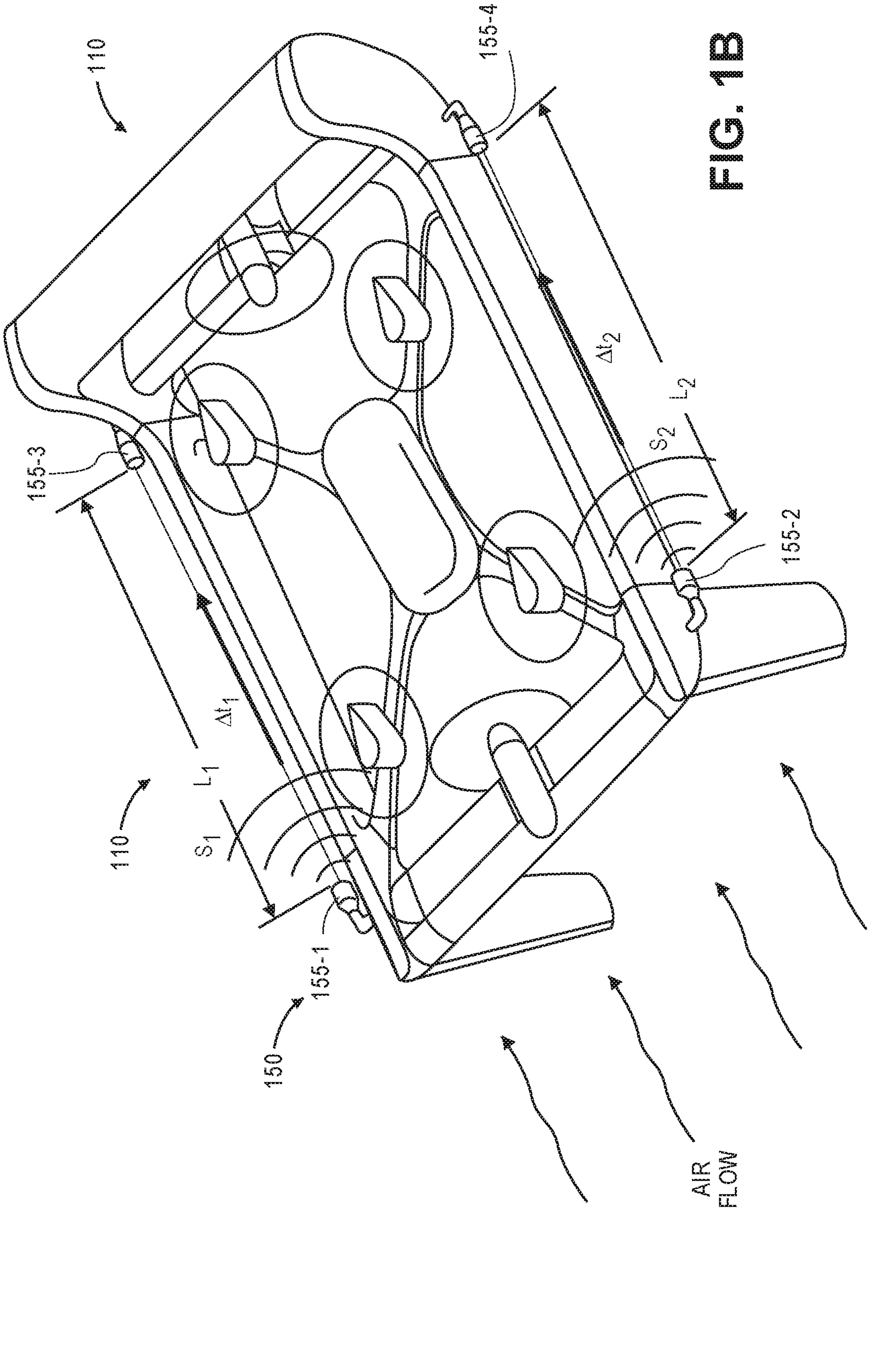
Figure 1C:
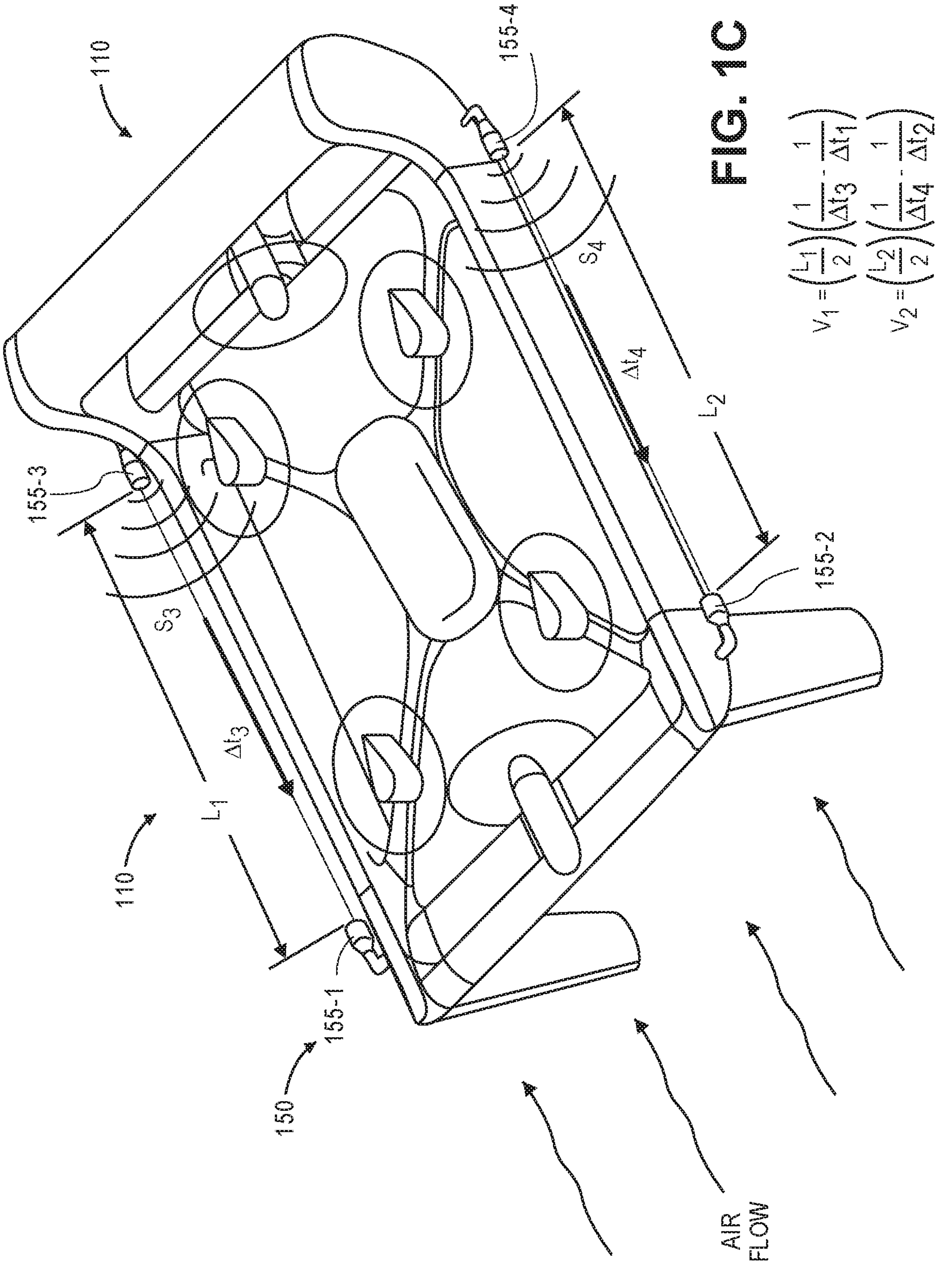

Referring to FIGS. 1A, 1B and 1C, views of an aerial vehicle 110 having an airframe 115 with components of an ultrasonic anemometer 150 embedded therein in accordance with embodiments of the present disclosure are shown. The aerial vehicle 110 is shown as operating in the presence of air flow. The aerial vehicle 110 includes a plurality of movable control surfaces 130-1, 130-2, 130-3, 130-4, 130-5, 130-6, a plurality of fixed control surfaces 135-1, 135-2, 135-5, and a plurality of motors 140-1, 140-2, 140-3, 140-4, 140-5, 140-6, each having a propeller rotatably coupled thereto. The aerial vehicle 110 further includes a control system 112 provided substantially centrally with respect to the frame 115. The aerial vehicle 110 further includes an ultrasonic anemometer 150 having a plurality of ultrasonic transducers 155-1, 155-2, 155-3, 155-4 oriented toward one another.

The ultrasonic transducers 155-1, 155-2, 155-3, 155-4 may be any type of acoustic sensors (e.g., transceivers) that are configured to transmit and/or receive acoustic signals of acoustic energy, such as beams or pulses, or bursts of beams or pulses, to or from one another. For example, one or more of the ultrasonic transducers 155-1, 155-2, 155-3, 155-4 may include electromagnetic components, electrostatic components and/or piezoelectric components, such as one or more diaphragms, coils, magnets, resistors, capacitors, inductors, membranes, transformers, voltage sources, crystals, ceramics or other elements), or any other components, for transmitting or receiving acoustic signals.

Additionally, the ultrasonic transducers 155-1, 155-2, 155-3, 155-4 may be aligned along any given path (or axis), or configured to transmit signals having any width or spread with respect to the given path, and any frequency or interval with respect to one another. For example, as is shown in FIG. 1B and FIG. 1C, the ultrasonic transducer 155-1 and the ultrasonic transducer 155-3 are separated by a length $L_1$ and coaxially aligned toward one another along a first path on a starboard side of the aerial vehicle 110. The ultrasonic transducer 155-2 and the ultrasonic transducer 155-4 are separated by a length $L_2$ and coaxially aligned toward one another along a second path on a port side of the aerial vehicle 110, and in parallel with the first path. The ultrasonic transducers 155-1, 155-3 and the ultrasonic transducers 155-2, 155-4 may be in a fixed coaxial alignment with respect to one another to determine air speeds in directions corresponding to their respective alignments or, alternatively, or may be configured to be reoriented or realigned in order to perform other functions or be utilized for other purposes, as necessary.

Ultrasonic anemometers, such as the ultrasonic transducer 150, operate to determine velocities of air flow according to anemometry principles, e.g., based on differences between the times in flight of acoustic signals transmitted between pairs of ultrasonic transducers in the presence of the air flow. As is shown in FIG. 1B, a first acoustic signal $S_1$ is transmitted by the ultrasonic transducer 155-1, and received by the ultrasonic transducer 155-3, in an elapsed time $\Delta t_1$, while a second acoustic signal $S_2$ is transmitted by the ultrasonic transducer 155-2, and received by the ultrasonic transducer 155-4, in an elapsed time $\Delta t_2$. As is shown in FIG. 1C, a third acoustic signal $S_3$ is transmitted by the ultrasonic transducer 155-3, and received by the ultrasonic transducer 155-1, in an elapsed time $\Delta t_3$, while a fourth acoustic signal $S_4$ is transmitted by the ultrasonic transducer 155-4, and received by the ultrasonic transducer 155-2, in an elapsed time $\Delta t_4$. The acoustic signals $S_1$, $S_2$, $S_3$, $S_4$ may include one or more pulses of any frequency, or pulses residing in any frequency spectrum, and having any duration. For example, in some embodiments, the acoustic signals $S_1$, $S_2$, $S_3$, $S_4$ may include pulses having frequencies of at least twenty kilohertz (20 kHz) or, preferably, in ranges between twenty and five hundred kilohertz (20-500 kHz). In some other embodiments, the acoustic signals $S_1$, $S_2$, $S_3$, $S_4$ may include pulses having frequencies in ranges at one megahertz (1 MHz) or more. In some embodiments, the acoustic signals $S_1$, $S_2$, $S_3$, $S_4$ may have durations on the order of one microsecond (1 μs) to one millisecond (1 ms), or durations of more than one millisecond. Moreover, the pulses may be transmitted at any repetition frequency or for any repetition period.

Based on the differences between the elapsed time $\Delta t_1$ that was required for the first acoustic signal $S_1$ to travel the distance $L_1$ from the ultrasonic transducer 155-1 to the ultrasonic transducer 155-3, and the elapsed time $\Delta t_3$ that was required for the third acoustic signal $S_3$ to travel the distance $L_1$ from the ultrasonic transducer 155-3 to the ultrasonic transducer 155-1, a first measure $V_1$ of the velocity of the wind passing along the path between the ultrasonic transducer 155-1 and the ultrasonic transducer 155-3 may be determined. Similarly, based on the differences between the elapsed time $\Delta t_2$ that was required for the second acoustic signal $S_2$ to travel the distance $L_2$ from the ultrasonic transducer 155-2 to the ultrasonic transducer 155-4, and the elapsed time $\Delta t_4$ that was required for the fourth acoustic signal $S_4$ to travel the distance $L_2$ from the ultrasonic transducer 155-4 to the ultrasonic transducer 155-2, a second measure $V_1$ of the velocity of the wind passing along the path between the ultrasonic transducer 155-2 and the ultrasonic transducer 155-4 may be determined. The measures $V_1$, $V_2$ of the velocity of the wind may be determined without regard to the speed of sound within the air between the ultrasonic transducers 155-1, 155-3 or the ultrasonic transducers 155-2, 155-4. Because the ultrasonic transducers 155-1, 155-3 and the ultrasonic transducers 155-2, 155-4 are aligned in parallel to a longitudinal axis of the aerial vehicle 110, the measures $V_1$, $V_2$ may also be utilized to calculate an air speed of the aerial vehicle 110 in a forward direction, e.g., a direction of the longitudinal axis. Additionally, depending on a mode of operation of the aerial vehicle 110, one or more operational decisions may be made based on the measures $V_1$, $V_2$. For example, the aerial vehicle 110 may automatically select or change a course or angle of attack of the aerial vehicle 110, a position or alignment of one or more of the movable control surfaces 130-1, 130-2, 130-3, 130-4, 130-5, 130-6, or an operational speed of one or more of the motors 140-1, 140-2, 140-3, 140-4, 140-5, 140-6, in response to the measures $V_1$, $V_2$.

As is discussed above, the motion and/or angular orientation of an operating aerial vehicle may be directly impacted by forces imparted upon the aerial vehicle by wind. For example, when an aerial vehicle is engaged in forward flight, headwinds or tailwinds may aid or inhibit the forward motion of the aerial vehicle, while crosswinds, updrafts or downdrafts may cause the aerial vehicle to experience yaw, pitch or roll about a longitudinal axis, a lateral horizontal axis or a vertical axis. In particular, a fixed-wing aerial vehicle engaged in forward flight relies on the presence of air flow to generate lift, in response to a difference in pressures supplied by air flowing above and below a fixed wing. Moreover, when an aerial vehicle is engaged in vertical flight, or is hovering, the operation of motors and/or control surfaces may be required in order to maintain the aerial vehicle at a desired altitude, in a desired orientation, or along a desired vertical axis when the aerial vehicle encounters any type of wind, including not only headwinds or tailwinds but also crosswinds, updrafts or downdrafts.

Ultrasonic anemometers are devices for determining speeds and directions of wind flows based on ultrasonic pulses of sound that are emitted into the wind flows by a transmitter and captured by a receiver. An ultrasonic anemometer determines the speed of wind passing along a path or axis over a finite distance between the transmitter and the receiver, which may be a pair of transducers, based on the transit times or elapsed times (e.g., times of flight) of each of the pulses. Where the wind conditions along a path or an axis between a pair of transducers are comparable in either direction, such as in a still medium, or when any motion of the medium present is transverse to the path or the axis, the transit times or elapsed times for acoustic signals (e.g., beams or pulses, or bursts of beams or pulses), traveling from one of the transducers to the other transducer along the path or the axis, in either direction, may be expected to be identical. When the conditions along the path or the axis are favorable in one direction along the path or the axis or disfavorable in another direction, however, the transit times or elapsed times for such signals will be different. In particular, a transit time for an acoustic signal traveling into (or opposing) wind flow will be greater than a transit time for an acoustic signal traveling with the wind flow.

It is axiomatic that speed is a ratio of distance to time. Ultrasonic anemometers exploit the differences in the speeds of such acoustic signals in the presence of a flowing medium in making determinations as to a velocity of the flowing medium, i.e., a speed of wind along a direction of a path or an axis between a pair of transducers. As is noted above, in a still medium, e.g., in the absence of wind flow, a transit time $\Delta t$ of an acoustic signal transmitted from one transducer to another transducer along a path or an axis is equal to a distance L between the transducers along the path or the axis divided by a speed of sound c in the medium between the transducers, or $\Delta t=L/c$. In a medium having a medium flowing at a speed of v along the path or the axis, however, a transit time $\Delta t$ of an acoustic signal transmitted from one transducer to another transducer along a path or an axis through the medium is equal to the distance L between the transducers along the path or the axis divided by a sum of the speed of sound c and the speed of the medium v, or $\Delta t=L/(c\pm v)$, depending on a direction in which the medium flows. Thus, where an ultrasonic anemometer includes a pair of transducers that transmit acoustic signals $S_1$, $S_2$ between one another in the presence of wind flow along a common path or axis, i.e., the distance L, a representation of the speed of the wind flow v may be determined based on equations for determining the transit times $\Delta t_1$, $\Delta t_2$, according to Equations (1) and (2), below:

$$\Delta t_1 = \frac{L}{(c - v)} \quad (1)$$

$$\Delta t_2 = \frac{L}{(c + v)} \quad (2)$$

By solving each of the Equations (1) and (2) for the speed of sound c in the wind flow, the speed of sound c may be canceled out of the equations, resulting in the following representation of the speed of the wind flow v as a function of the transit times $\Delta t_1$, $\Delta t_2$, independent of the speed of sound c in the medium, according to the Equation (3), below:

$$v = \frac{L}{2}\left(\frac{1}{\Delta t_2} - \frac{1}{\Delta t_1}\right) \quad (3)$$

The systems and methods of the present disclosure are directed to aerial vehicles, including manned or unmanned aerial vehicles ("UAV"), such as drones, that are outfitted with ultrasonic anemometers having components mounted to airframes or other aspects of the aerial vehicles. The ultrasonic anemometers may include transducers that are configured to transmit acoustic signals or energy in the form of beams or pulses, or bursts of beams or pulses, to one or more other transducers, and receive acoustic signals or energy from one or more transducers, while storing times at which such signals are transmitted and received. The ultrasonic anemometers may further include computer systems and/or one or more filtering circuits or other components configured to cause the acoustic signals to be transmitted within specific frequency spectra, or to recognize and extract such signals from captured noise. Additionally, where an aerial vehicle is outfitted with ultrasonic anemometers having a plurality of pairs of ultrasonic transducers, e.g., for determining velocity components in a number of directions and/or a net velocity such as by vector addition or linear algebra principles, the operation of the transducers may be timed or otherwise coordinated in order to ensure that acoustic signals are neither transmitted nor received simultaneously, in order to maximize the precision of the elapsed times determined based on the transmissions and receipts of the acoustic signals, and the resolution of the speed determinations made thereby.

In some embodiments, the ultrasonic anemometers of the present disclosure may include transducers that are specifically dedicated to transmitting acoustic signals or energy to other transducers, and receiving acoustic signals or energy from other transducers, in order to derive air speeds along paths or axes between such transducers, and are utilized exclusively for this purpose. In some embodiments, the ultrasonic anemometers of the present disclosure may include transducers that may perform multiple functions or be utilized for multiple purposes. For example, where an aerial vehicle includes one or more ultrasonic transducers for depth ranging, object recognition or collision avoidance, or any other purposes, such ultrasonic transducers may be reconfigured, reoriented, rotated, repositioned or pivoted, as necessary, and utilized for the transmission and receipt of acoustic signals for deriving air speeds along particular paths or axes. The ultrasonic transducers may be reconfigured, reoriented, rotated, repositioned or pivoted using any known systems, e.g., one or more prime movers such as electric motors, hydraulic systems or the like, in order to transmit acoustic signals to or receive acoustic signals from one or more other transducers, or to perform any other functions or utilized for any other purposes in accordance with the present disclosure.

The systems and methods of the present disclosure are also directed to determining one or more velocity vectors corresponding to wind flow, or motion of the aerial vehicles, based on outputs determined using the ultrasonic anemometers. Because ultrasonic anemometry may be used to quickly determine air velocities according to equations or formulas such as the Equation (3) shown above, air velocities that are determined accordingly may be utilized to exercise precise control over an aerial vehicle, and to respond to changes to wind flow or forces imparted thereby in a faster and more efficient manner than according to traditional systems or methods, such as Pitot tubes. For example, an angle of attack of an aerial vehicle that is engaged in forward flight, a position of one or more control surfaces on the aerial vehicle, or operating speeds of one or more propulsion motors aboard the aerial vehicle may be selected or modified based on a wind velocity (e.g., a speed and a direction) that is determined using one or more ultrasonic anemometers having components mounted to external surfaces of an airframe or other aspects of the aerial vehicle. Similarly, where an aerial vehicle is engaged in vertical flight, or is hovering, the operation of one or more motors or control surfaces may be selected or modified based on detected velocities of wind, or changes in such velocities, in order to ensure that the aerial vehicle remains in a desired orientation (e.g., yaw, pitch or roll angles) about its principal axes, or at a desired altitude or velocity in the presence of the wind.

Figure 2:
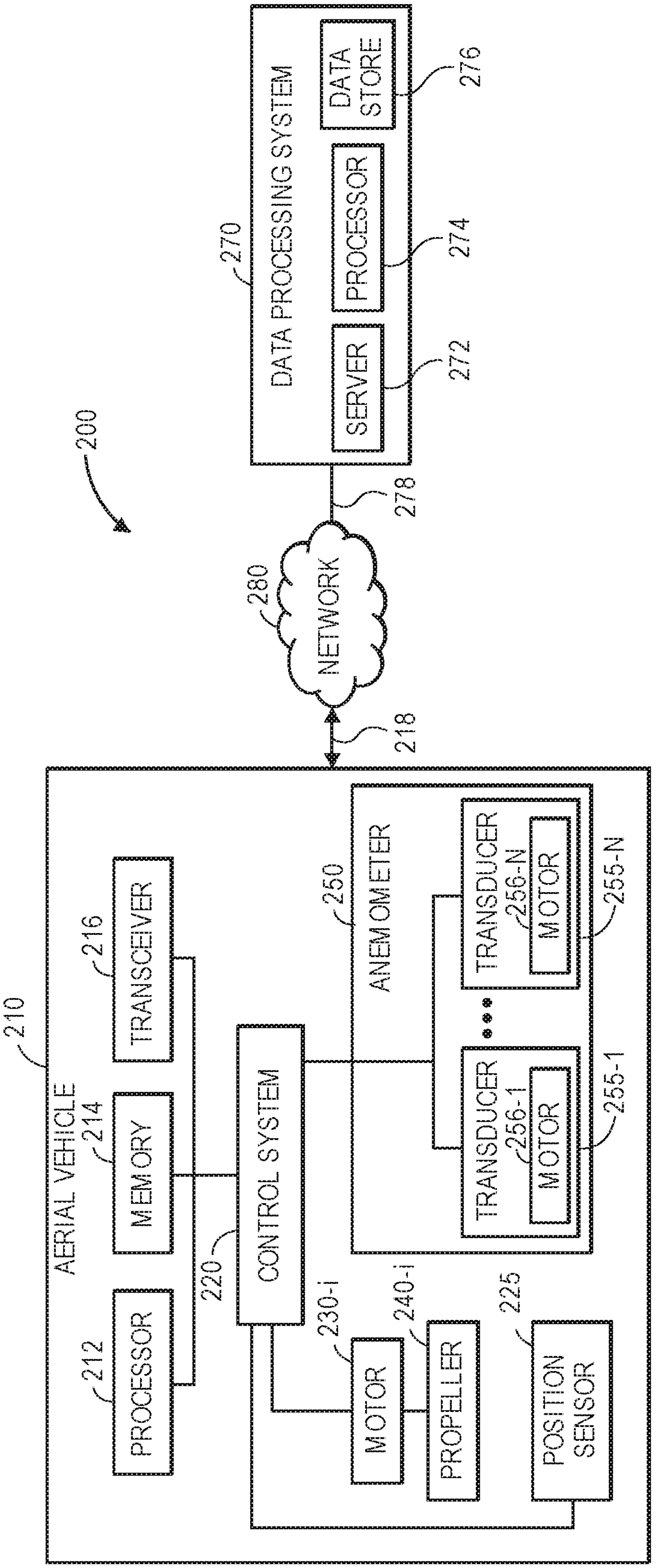
FIG. 2 is a block diagram of one system including an aerial vehicle having an ultrasonic anemometer in accordance with embodiments of the present disclosure.

Referring to FIG. 2, a block diagram of one system 200 including an aerial vehicle 210 having an ultrasonic anemometer 250 in accordance with embodiments of the present disclosure is shown. The system 200 of FIG. 2 includes an aerial vehicle 210 and a data processing system 270 connected to one another over a network 280, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1C.

The aerial vehicle 210 includes a processor 212, a memory 214 and a transceiver 216. The aerial vehicle 210 further includes a control system 220, a position sensor 225, one or more propulsion motors 230-*i*, each of which is rotatably coupled to a propeller 240-*i*, and an ultrasonic anemometer 250.

The processor 212 may be configured to perform any type or form of computing function, including but not limited to the execution of one or more machine learning algorithms or techniques. For example, the processor 212 may control any aspects of the operation of the aerial vehicle 210 and the one or more computer-based components thereon, including but not limited to the propulsion motors 230-*i*, the propellers 240-*i* and the ultrasonic anemometer 250. For example, the processor 212 may control the operation of one or more control systems or modules, such as the control system 220, for generating instructions for conducting operations of one or more of the propulsion motors 230-*i*, the propellers 240-*i* and the ultrasonic anemometer 250, including but not limited to instructions for causing the propulsion motors 230-*i* to operate at a predetermined or selected speed, for causing the propellers 240-*i* to rotate at a predetermined or selected pitch or configuration, or for causing the ultrasonic anemometer 250 to transmit or receive acoustic signals and/or energy, determine transit times for such signals or energy, or calculate velocities based on such transit times. The processor 212 may control the operation of one or more control surfaces (not shown), including but not limited to wings, rudders, ailerons, elevators, flaps, brakes, slats or other features. Such control systems or modules may be associated with one or more other computing devices or machines, and may communicate with the data processing system 270 or one or more other computer devices (not shown) over the network 280, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor implementing any of a number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, flight paths, flight control parameters and/or other data items accessible by or to the processor 212. The memory 214 may be implemented using any suitable memory technology, such as static random access memory (SRAM), synchronous dynamic RAM (SDRAM), nonvolatile/Flash-type memory, or any other type of memory. In some embodiments, program instructions, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "WiFi") protocol, such as over the network 280 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 280. For example, in some embodiments, the transceiver 216 may be configured to coordinate I/O traffic between the processor 212 and one or more onboard or external computer devices or components. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling the operation of the aerial vehicle 210 and for engaging with or releasing items (not shown), as desired. For example, the control system 220 may be configured to cause or control the operation of one or more of the propulsion motors 230-*i*, the propellers 240-*i* and the ultrasonic anemometer 250, such as to cause one or more of the propulsion motors 230-*i* to rotate the propellers 240-*i* at a desired speed, in order to guide the aerial vehicle 210 along a determined or desired flight path, or to cause the ultrasonic anemometer 250 to transmit, receive and process acoustic signals or energy, in order to determine one or more velocities thereby. The control system 220 may further control other aspects of the aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216.

The position sensor 225 may be any system or component for determining information or data regarding a position of the aerial vehicle 210, e.g., in real time or near-real time. Information or data regarding positions of the aerial vehicle 210 may include, but is not limited to, one or more geolocations, or geospatially-referenced points that precisely define locations of the aerial vehicle 210 in space using one or more geocodes, such as a set of coordinates, e.g., a latitude and a longitude and, optionally, an elevation of the aerial vehicle 210. Alternatively, or additionally, the position sensor 225 may be configured to determine positions of the aerial vehicle 225 forensically, such as after a mission has been completed. For example, in some embodiments, the position sensor 225 may be or include a GPS receiver in communication with one or more orbiting satellites or other components of a GPS system that is configured to receive geolocations and/or geocodes from such satellites. The position sensor 225 may also be or include an imaging device that is configured to capture one or more images, and to determine positions and/or velocities of the aerial vehicle 210 based on such images, e.g., according to one or more visual odometry techniques. The position sensor 225 may also be or include a laser device configured to emit one or more laser beams or signals, and to determine a position and/or velocity of the aerial vehicle 210 based on differences between scans of such beams or signals. The position sensor 225 may also be or include an inertial system including one or more sensors such as accelerometers and/or gyroscopes for sensing motion and/or orientations of the aerial vehicle 210. The position sensor 225 may be or include a cellular transmitter and/or receiver, e.g., one or more component parts of the transceiver 216, which may determine a position of the aerial vehicle 210 by triangulation of signals received from multiple cellular transmission towers (preferably at least three of such towers).

The propulsion motors 230-*i* may be any type or form of motor (e.g., electric, gasoline-powered or any other motor) capable of generating sufficient rotational speeds of corresponding propellers 240-*i* or other components to provide lift and/or thrust forces to the aerial vehicle 210 and any payload engaged thereby, to aerially transport the engaged payload from one location to another. For example, one or more of the propulsion motors 230-*i* may be a brushless direct current (DC) motor such as an outrunner brushless motor or an inrunner brushless motor.

The propulsion motors 230-*i* may be of any kind, and may be dedicated to one or more purposes or functions. For example, one or more of the propulsion motors 230-*i* may be aligned or configured to provide forces of lift to the aerial vehicle 210, exclusively, while one or more of the propulsion motors 230-*i* may be aligned or configured to provide forces of thrust to the aerial vehicle 210, exclusively. Alternatively, one or more of the propulsion motors 230-*i* may be aligned or configured to provide forces of lift and/or forces of thrust to the aerial vehicle 210, as needed. For example, the propulsion motors 230-*i* may be fixed in their orientation on the aerial vehicle 210, or configured to vary their respective orientations, e.g., a tilt-rotor aircraft. Moreover, the propulsion motors 230-*i* may be aligned or configured to operate with different capacities or ratings, or at different speeds, or coupled to propellers having different sizes and shapes.

The propellers 240-*i* may be any rotors or rotatable systems having a plurality of shaped blades joined to a hub or boss. Each of the propellers 240-*i* is rotatably mounted to a mast or shaft associated with a corresponding one of the propulsion motors 230-*i* and configured to generate forces of thrust when rotated within a fluid. Each of the propellers 240-*i* may include any number of blades, and may be fixed pitch, adjustable pitch or variable pitch in nature. Moreover, one or more of the propellers 240-*i* may be banded or shielded in any manner. In some embodiments, one or more of the propellers 240-*i* may be configured to rotate about a vertical axis, and to provide forces of thrust in a vertical direction (e.g., upward) accordingly. In some other embodiments, one or more of the propellers 240-*i* may be configured to rotate about a horizontal axis, and to provide forces of thrust in a horizontal direction (e.g., forward) accordingly. In still other embodiments, one or more of the propellers 240-*i* may be configured to rotate about axes that are neither horizontal nor vertical, and to provide forces of thrust in directions corresponding to such axes accordingly.

The ultrasonic anemometer 250 includes at least one pair of ultrasonic transducers 255-1 . . . 255-*n* that are physically mounted to external surfaces of the aerial vehicle 210 and configured to transmit acoustic signals or energy to one another, and receive acoustic signals or energy from one another. The transducers 255-1 . . . 255-*n* may include any number of components associated with the generation and transmission of acoustic signals or energy, or the receipt and processing of acoustic signals or energy, including but not limited to one or more computer processors or other systems for generating and transmitting or receiving and processing acoustic signals or energy transmitted along a given path or axis, determining elapsed times or transit times associated with such signals or energy, calculating speeds of air or another medium along the given path or axis and determining velocities of the air or the other medium accordingly. Such systems may include one or more generating components (e.g., generators of acoustic waves or pulses), multiplexers, drivers, clocking components, drivers, processors, switches, logic or other circuitry or components. Additionally, the ultrasonic anemometer 250 and/or the one or more ultrasonic transducers 255-1 . . . 255-*n* may include any number of bases, support structures, casings, openings, or other components formed from aluminum, fiberglass or any other suitable materials that may be mounted to or associated with a portion of an airframe of the aerial vehicle 210. As is shown in FIG. 2, the ultrasonic transducers 255-1 . . . 255-*n* further include motors 256-1 . . . 256-*n* for orienting or reorienting the respective ultrasonic transducers 255-1 . . . 255-*n* in a predetermined direction or about a predetermined path or axis. The motors 256-1 . . . 256-*n* may be any type of device configured to orient or reorient a transducer in any direction, including but not limited to a single-phase induction motor of any suitable power rating or torque rating. In some embodiments, each of the ultrasonic transducers 255-1 . . . 255-*n* may include an associated one of the motors 256-1 . . . 256-*n* to orient or reorient the transducer about one or more axes, such as is shown in FIG. 2. In other embodiments, however, some of the ultrasonic transducers 255-1 . . . 255-*n* may include associated motors 256-1 . . . 256-*n*, and others of the ultrasonic transducers 255-1 . . . 255-*n* may be fixed in their orientation about the one or more axes and need not include a motor.

In some embodiments, one or more of the transducers 255-1 . . . 255-*n* may be piezoelectric transducers having piezoelectric elements (e.g., charged crystals, ceramics or other components) that generate an electric field or a mechanical vibration according to the piezoelectric effect, i.e., in response to a mechanical shock or electric current. The transducers 255-1 . . . 255-*n* may further include one or more plates, conductors, frames or structures that are selected in order to transmit or receive acoustic signals or energy at preferred ranges or spectra of frequencies, which may be selected based on the desired levels of energy to be transmitted thereby, the distances between a transmitting transducer and a receiving transducer, or any other relevant factor. In some embodiments, one or more of the transducers 255-1 . . . 255-*n* may include a transmitter and a receiver having a plate or other external face having a substantially round cross-section (e.g., a piston transducer, or a piston source transducer) that is configured to transmit a field of acoustic energy therefrom along a given axis, and receive a field of acoustic energy thereon. In some embodiments, an extent of beam spread or beam divergence from the axis may depend on any number of factors, including the acoustic properties of the medium into which the acoustic energy is emitted, a width or radius of the face of the transducer, a frequency of the transducer, or others. In other embodiments, one or more of the transducers 255-1 . . . 255-*n* may have faces of any shape for transmitting or receiving energy, including planar faces that are square, rectangular or arranged in an array with any number or type of other shapes, as well as rounded or non-planar faces. The transducers 255-1 . . . 255-*n* may be configured to transmit acoustic signals or energy aligned or around a single axis, or multiple axes, such as by orienting the transducers 255-1 . . . 255-*n* using one or more of the motors 256-1 . . . 256-*n*. In some embodiments, one or more of the transducers 255-1 . . . 255-*n* may be electromagnetic transducers or electrostatic transducers.

The ultrasonic anemometer 250 and/or one or more of the transducers 255-1 . . . 255-*n* may be in communication with any type of form of devices for processing information or data regarding acoustic signals or energy that are transmitted and/or received by the transducers 255-1 . . . 255-*n*, e.g., elapsed times or transit times and distances between such transducers, or velocities determined thereby. Such devices may include, but are not limited to, the processor 212, the memory 214, the transceiver 216, one or more computer processors associated with the control system 220, the position sensor 225, the server 272, the processor 274, the data store 276 of the data processing system 270, or any other computer devices or systems (e.g., circuits and/or transistors) operating aboard the aerial vehicle 210 or in one or more alternate or virtual locations, e.g., in a "cloud"-based environment.

In addition to the ultrasonic anemometer 250 and the ultrasonic transducers 255-1 . . . 255-*n*, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include imaging devices (e.g., digital cameras), microphones or other acoustic sensors, compasses, speedometers, altimeters, thermometers, barometers, hygrometers, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, or sound sensors (e.g., microphones, piezoelectric sensors, vibration sensors or other transducers for detecting and recording acoustic energy from one or more directions).

The data processing system 270 includes one or more physical computer servers 272 having one or more computer processors 274 and any number of data stores 276 (e.g., databases) associated therewith, as well as provided for any specific or general purpose. For example, the data processing system 270 of FIG. 2 may be independently provided for the exclusive purpose of receiving, analyzing or storing information regarding acoustic signals or energy, transit times or elapsed times associated with the transmission and receipt of such signals or energy, velocities (e.g., speeds or directions) or other information or data received from the aerial vehicle 210 or, alternatively, provided in connection with one or more other physical or virtual services configured to receive, analyze or store such information or data, as well as one or more other functions. The servers 272 may be connected to or otherwise communicate with the processors 274 and the data stores 276, which may store any type of information or data, including but not limited to acoustic signals or energy, or information or data regarding environmental conditions, operational characteristics, or positions, for any purpose. The servers 272 and/or the computer processors 274 may also connect to or otherwise communicate with the network 280, as indicated by line 278, through the sending and receiving of digital data. For example, the data processing system 270 may include any facilities, stations or locations having the ability or capacity to receive and store information or data, such as media files, in one or more data stores, e.g., acoustic signals or energy, or related information or data received from the aerial vehicle 210, or from one another, or from one or more other external computer systems (not shown) via the network 280. In some embodiments, the data processing system 270 may be provided in a physical location. In other such embodiments, the data processing system 270 may be provided in one or more alternate or virtual locations, e.g., in a "cloud"-based environment. In still other embodiments, the data processing system 270 may be provided onboard one or more aerial vehicles, including but not limited to the aerial vehicle 210.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the aerial vehicle 210 may be adapted to transmit information or data in the form of synchronous or asynchronous messages to the data processing system 270 or to any other computer device (e.g., to one or more other aerial vehicles) in real time or in near-real time, or in one or more offline processes, via the network 280. Those of ordinary skill in the pertinent art would recognize that the aerial vehicle 210 or the data processing system 270 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212, the control system 220 or the processor 274, or any other computers or control systems utilized by the aerial vehicle 210 or the data processing system 270 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
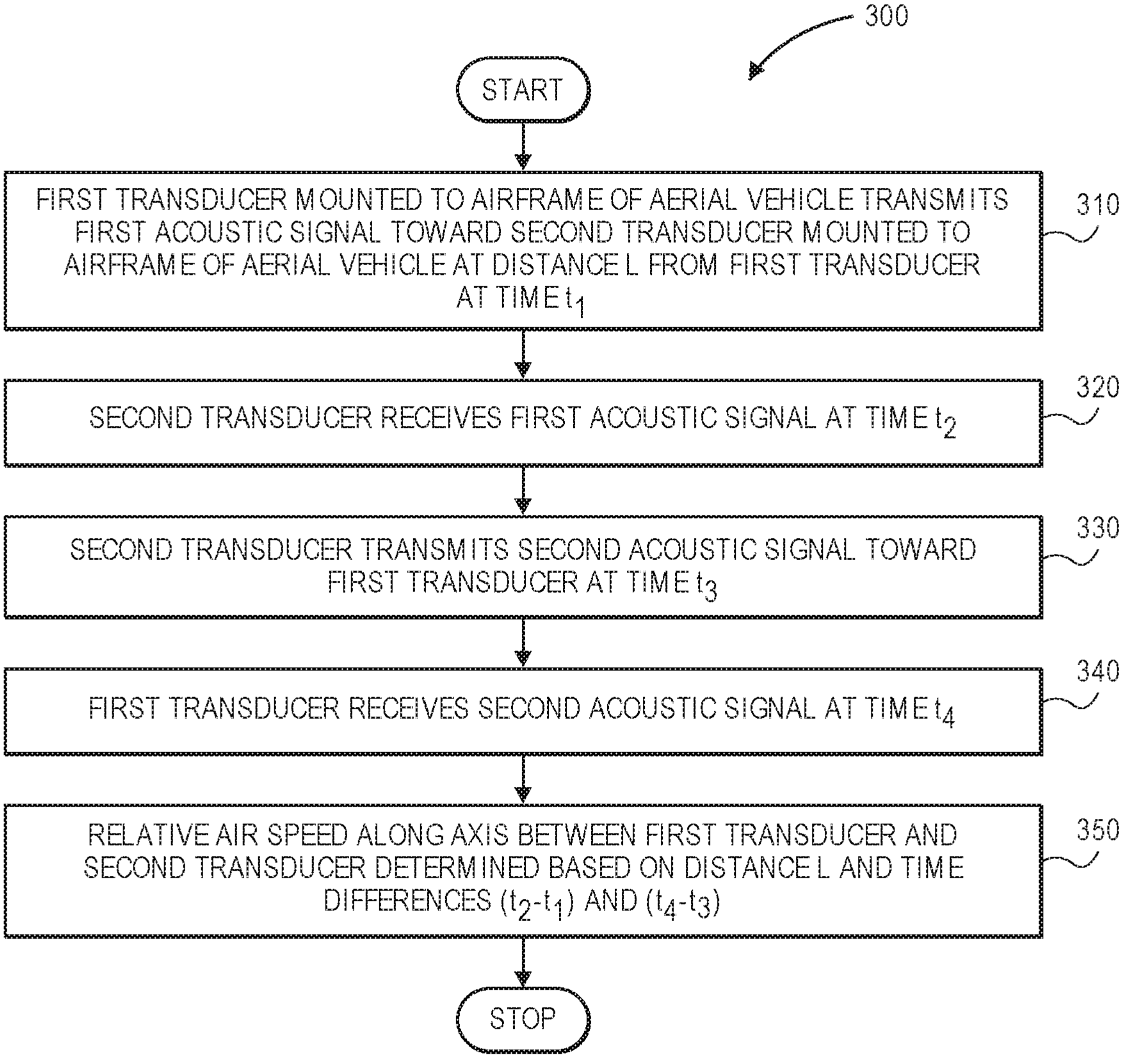
FIG. 3 is a flow chart of one process for operating an aerial vehicle having an ultrasonic anemometer in accordance with embodiments of the present disclosure.

As is discussed above, an aerial vehicle may include one or more ultrasonic anemometers, each having one or more pairs of ultrasonic transducers, for determining a relative velocity of a medium, e.g., air in which the aerial vehicle is operating in one or more flight modes. Referring to FIG. 3, a flow chart 300 of one process for operating an aerial vehicle having an ultrasonic anemometer in accordance with embodiments of the present disclosure is shown. At box 310, a first transducer mounted to an airframe of the aerial vehicle transmits a first acoustic signal toward a second transducer mounted to the airframe, at a distance L from the first transducer, at a time $t_1$. The first transducer and/or the second transducer may be a piezoelectric transducer, an electromagnetic transducer, an electrostatic transducer, or any other type of transducer configured to transmit an acoustic signal at one or more predetermined ultrasonic frequencies and along one or more axes or paths, or to receive such an acoustic signal. The first acoustic signal may include any number of beams or pulses that may be transmitted in any number of bursts, at any intensity, and repeated at any frequency or for any period. Upon transmitting the first acoustic signal, information or data (including metadata) regarding the transmission of the first acoustic signal, e.g., intensities and or frequency spectra of the first acoustic signal as transmitted, a number of pulses transmitted, or a duration of the first acoustic signal and/or a time at which the first acoustic signal was transmitted, may be stored in one or more data stores located on the aerial vehicle or in one or more alternate or virtual locations, e.g., in a "cloud"-based environment.

At box 320, the second transducer receives the first acoustic signal at a time $t_2$. Upon receiving the first acoustic signal, information or data (including metadata) regarding the receipt of the first acoustic signal, e.g., intensities and or frequency spectra of the first acoustic signal as received, as well as a time at which the first acoustic signal was received, a number of pulses received, or a duration of the first acoustic signal as received, may also be stored in one or more data stores.

At box 330, the second transducer transmits the second acoustic signal toward the first transducer at a time $t_3$, and at box 340, the first transducer receives the second acoustic signal at a time $t_4$. The second acoustic signal may be transmitted by the second transducer in a manner similar to that of the first acoustic signal, and may share one or more of the characteristics as the first acoustic signal (e.g., pulses, frequencies, durations, intensities), or may be entirely different from the first acoustic signal. Information or data (including metadata) regarding the transmission and receipt of the second acoustic signal may also be stored in one or more data stores.

At box 350, a relative air speed along an axis between the first transducer and the second transducer is determined based on the distance L and the differences in time ($t_4$-$t_3$) and ($t_2$−$t_1$), i.e., the transit times of the first acoustic signal and the second acoustic signal. As is discussed above, where air flow exists in either direction along the axis between the transducers, i.e., where the air flow is not transverse to the axis, the transit times of the first acoustic signal and the second acoustic signal will be different. A difference between the transit times may be used to determine a relative air speed along the axis, such as according to Equations (1), (2) and (3), above. A direction of the air speed along the axis may also be determined based on the transit times, such that the air flow is in the direction of the one of the first acoustic signal or the second acoustic signal having a lower transit time, and opposes the one of the first acoustic signal or the second acoustic signal having a higher transit time, and the process ends. Once the relative air speed is determined, an air velocity may be defined based on the relative air speed and a direction of the axis, and utilized for any purpose.

Figure 4:
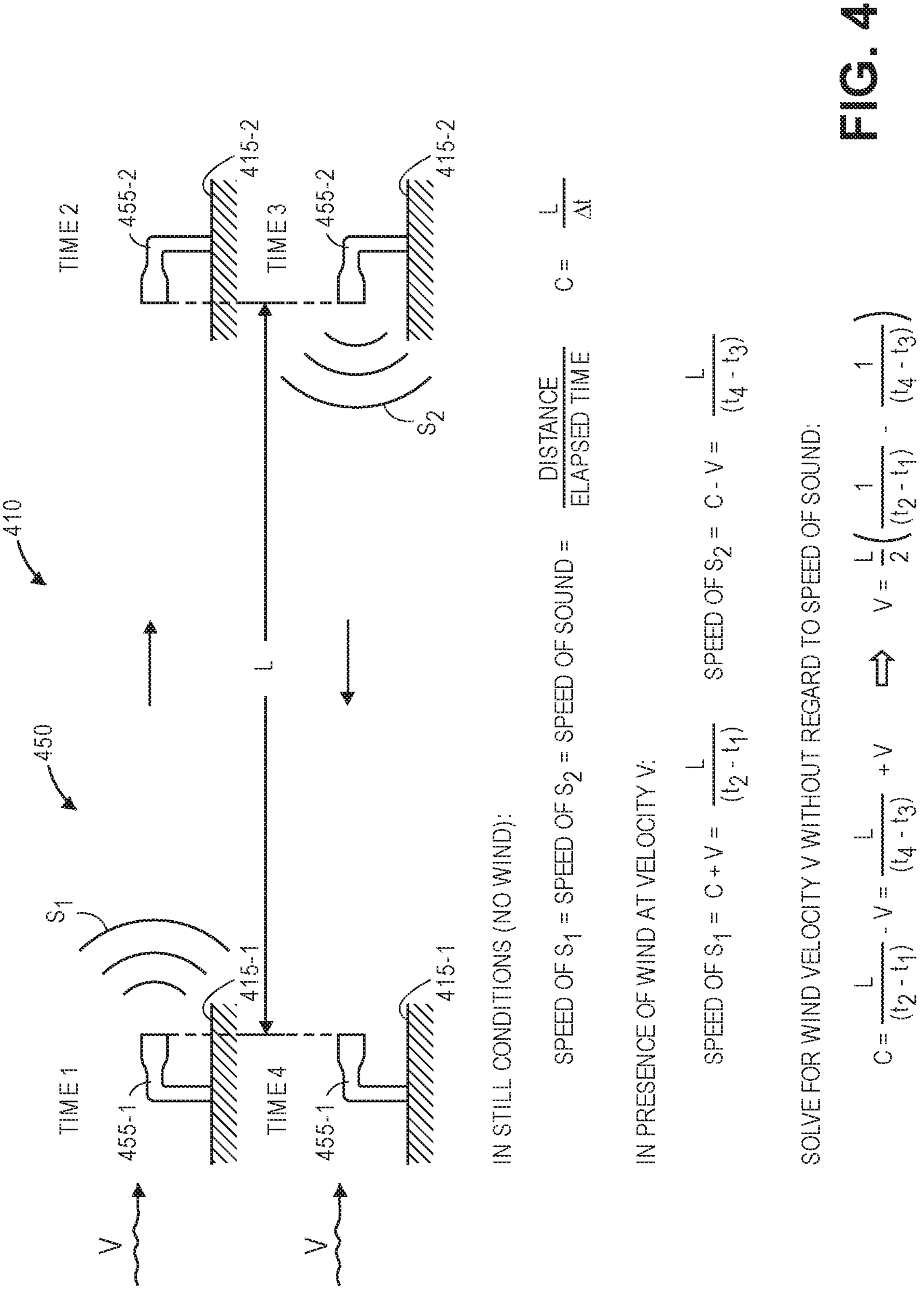
FIG. 4 is a view of aspects of an aerial vehicle having an ultrasonic anemometer in accordance with embodiments of the present disclosure.

Referring to FIG. 4, a view of aspects of an aerial vehicle 410 having an ultrasonic anemometer 450 in accordance with embodiments of the present disclosure are shown. Except where otherwise noted, reference numerals preceded by the number "4" shown in FIG. 4 indicate components or features that are similar to components or features having reference numerals preceded by the number "2" shown in FIG. 2 or by the number "1" shown in FIGS. 1A through 1C.

As is shown in FIG. 4, the ultrasonic anemometer 450 includes a first ultrasonic transducer 455-1 mounted to a first portion 415-1 of an airframe of the aerial vehicle 410 and a second ultrasonic transducer 455-2 mounted to a second portion 415-2 of the airframe of the aerial vehicle 410. The first acoustic transducer 455-1 is separated from the second acoustic transducer 455-2 by a distance L. The first acoustic transducer 455-1 and/or the second transducer 455-2 may be fixed in their respective orientations or, alternatively, configured to rotate or pivot about one or more axes, such as by one or more motors disposed within the airframe (not shown). The first ultrasonic transmitter 455-1 is shown as transmitting a first acoustic signal $S_1$ along a path or axis in a direction of the second ultrasonic transmitter 455-2 at a time $t_1$, and the first acoustic signal $S_1$ is received by the second ultrasonic transmitter 455-2 at a time $t_2$. The second ultrasonic transmitter 455-2 is shown as transmitting a second acoustic signal $S_2$ along the path or axis in the direction of the first ultrasonic transmitter 455-1 at a time $t_3$, viz., in an opposite direction of the first acoustic signal $S_1$, and the second acoustic signal $S_2$ is received by the first ultrasonic transmitter 455-1 at a time $t_4$.

Where the first portion 415-1 and the second portion 415-2 of the airframe of the aerial vehicle 410 are in still conditions and are not experiencing relative wind flows between one another, i.e., in the absence of all wind or where any wind is transverse to an axis between the first ultrasonic transducer 455-1 and the second ultrasonic transducer 455-2, the speeds of the acoustic signals $S_1$, $S_2$ in either direction along the axis are each equal to the speed of sound c, which is itself equal to the distance L divided by either the difference between the times $t_2$ and $t_1$, or the difference between the times $t_4$ and $t_3$, which should be equal to one another. Where the first portion 415-1 and the second portion

415-2 are experiencing a relative wind flow at a speed v between one another, i.e., flowing in a direction from the first ultrasonic transducer 455-1 to the second ultrasonic transducer 455-2, however, a speed of the acoustic signal $S_1$, which is transmitted in a direction of the wind flow, may be assumed to be equal to c+v, or the distance L divided by a difference between the time $t_2$ and the time $t_1$. Conversely, a speed of the acoustic signal $S_2$, which is transmitted in a direction opposite to the wind flow, may be assumed to be equal to c−v, or the distance L divided by a difference between the time $t_4$ and the time $t_3$.

Accordingly, the speed v of the wind flow may be solved for without regard to the speed of sound c, which may be assumed to be constant in the region between the first transducer 455-1 and the second transducer 455-2 along the distance L. As is shown in FIG. 4, the speed of sound c may be determined to equal a quotient of the distance L and the difference between the time $t_2$ and the time $t_1$, or $(t_2-t_1)$, less the speed v of the relative wind flow in the direction from the first transducer 455-1 to the second transducer 455-2. The speed of sound c may also be determined to equal a quotient of the distance L and the difference between the time $t_4$ and the time $t_3$, or $(t_4-t_3)$, plus the speed v of the relative wind flow in the direction from the first transducer 455-1 to the second transducer 455-2. The two equations for the speed of sound c may be used to solve for the speed v of the wind flow, and result in the Equation (3), shown above.

The process embodied in the flow chart 300 of FIG. 3, or practiced by the components shown in FIG. 4, may be utilized in connection with one or more ultrasonic anemometers having a single pair of transducers, such as is shown in FIG. 4, or multiple pairs of transducers, which may be aligned in parallel (e.g., for redundancy) or in non-parallel orientations. Where an ultrasonic anemometer includes multiple pairs of transducers having axes that are not aligned in parallel, components of air speed may be determined based on differences in transit times of acoustic signals transmitted and received in opposite directions along each of the axes and summed, e.g., according to vector addition or linear algebra principles, in order to derive a vector representative of the net effects of the air flow within the vicinity of the ultrasonic anemometer. An aerial vehicle may include one or more ultrasonic anemometers each having one or more pairs of ultrasonic transducers that are aligned orthogonally with respect to one another, i.e., aligned along x, y and z axes, and air speeds may be determined in the directions of such axes. The transducers may be mounted to an airframe or one or more other aspects of the aerial vehicle, preferably in regions of the airframe where the distances between the transducers, along the x, y and z axes, may be substantially maximized. Alternatively, an aerial vehicle may include an ultrasonic anemometer with four ultrasonic transducers aligned in a tetrahedral configuration, and may transmit and receive acoustic signals in accordance with a predetermined sampling pattern, sequence or schedule (e.g., within specific frequency spectra, at specific intensity levels, for specific durations, or at specific times) to determine air speeds along paths or axes extending between each of the transducers. A net vector representative of the air speeds and directions may be determined accordingly.

Figure 5:
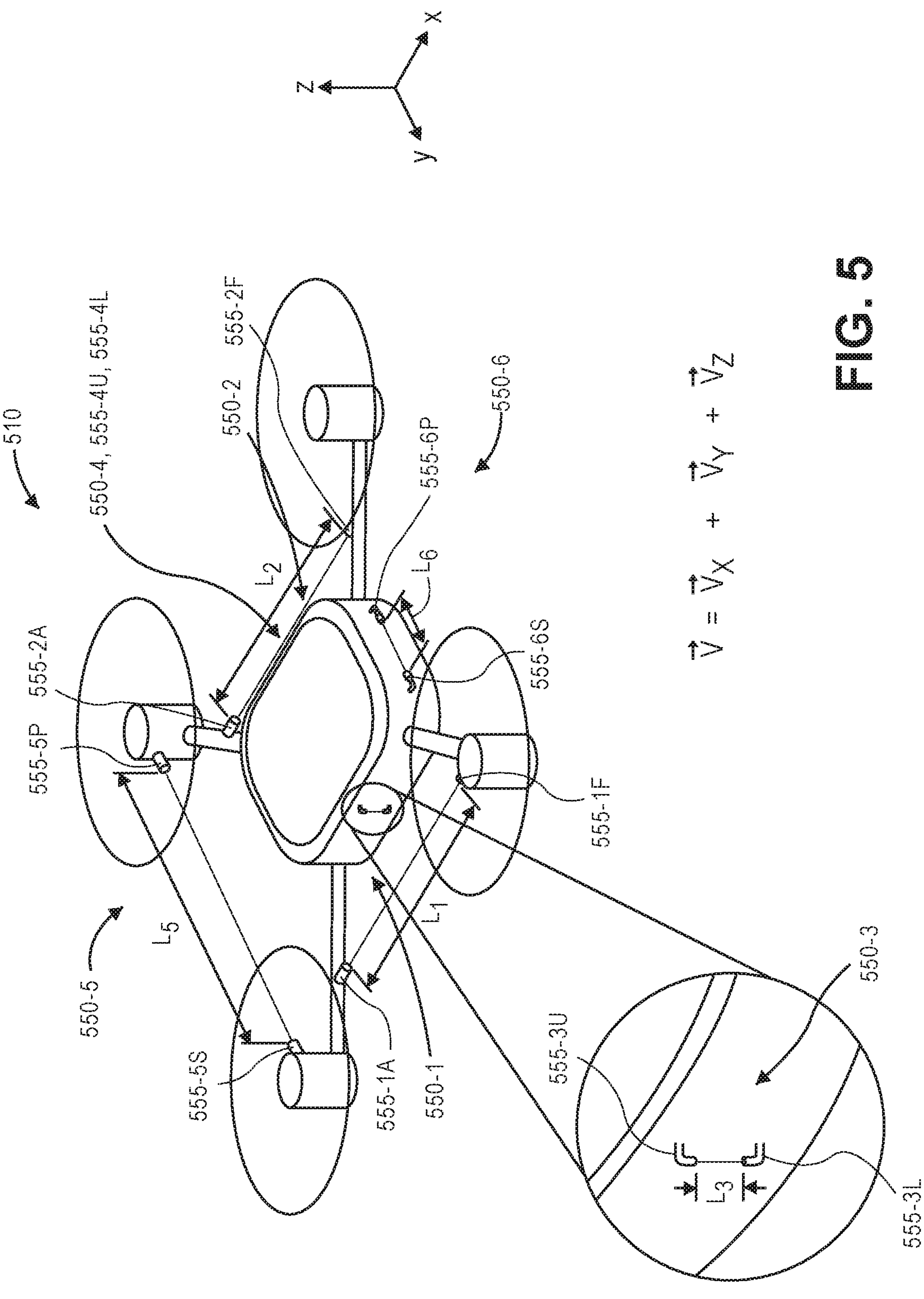
FIG. 5 is a view of an aerial vehicle having a plurality of ultrasonic anemometers in accordance with embodiments of the present disclosure.

Referring to FIG. 5, a view of an aerial vehicle 510 having a plurality of ultrasonic anemometers in accordance with embodiments of the present disclosure is shown. Except where otherwise noted, reference numerals preceded by the number "5" shown in FIG. 5 indicate components or features that are similar to components or features having reference numerals preceded by the number "4" shown in FIG. 4, by the number "2" shown in FIG. 2 or by the number "1" shown in FIGS. 1A through 1C.

As is shown in FIG. 5, the aerial vehicle 510 includes an airframe 515 and a plurality of ultrasonic anemometers 550-1, 550-2, 550-3, 550-4, 550-5, 550-6 aligned in substantially orthogonal orientations throughout the aerial vehicle 510. For example, the ultrasonic anemometer 550-1 includes a forward transducer 555-1F and an aft transducer 555-1A that are each fixed to arms for mounting propulsion motors to the airframe 515 on a starboard side of the aerial vehicle 510. The forward transducer 555-1F and the aft transducer 555-1A are aligned substantially horizontally with respect to one another along an axis that is parallel to a forward orientation of the aerial vehicle 510, e.g., parallel to a longitudinal axis (or x-axis) of the aerial vehicle 510, and separated by a distance $L_1$. The ultrasonic anemometer 550-2 includes a forward transducer 555-2F and an aft transducer 555-2A that are each fixed to arms for mounting propulsion motors to the airframe 515 on a port side of the aerial vehicle 510. The forward transducer 555-2F and the aft transducer 555-2A are aligned substantially horizontally with respect to one another along an axis that is parallel to the forward orientation of the aerial vehicle 510, e.g., parallel to the longitudinal axis (or x-axis) of the aerial vehicle 510, and separated by a distance $L_2$.

The ultrasonic anemometer 550-3 includes an upper transducer 555-3U and a lower transducer 555-3L that are each mounted to the airframe 515 on the starboard side of the aerial vehicle 510. The upper transducer 555-3U and the lower transducer 555-3L are aligned substantially vertically with respect to one another along an axis that is perpendicular to the forward orientation of the aerial vehicle 510, e.g., parallel to a vertical axis (or z-axis) of the aerial vehicle 510, and separated by a distance $L_3$. The ultrasonic anemometer 550-4 includes an upper transducer 555-4U and a lower transducer 555-4L mounted to the airframe 515 on the port side of the aerial vehicle 510. The upper transducer 555-4U and the lower transducer 555-4L are aligned substantially vertically with respect to one another along an axis that is perpendicular to the forward orientation of the aerial vehicle 510, e.g., parallel to the vertical axis (or z-axis) of the aerial vehicle 510, and separated by a distance $L_4$.

The ultrasonic anemometer 550-5 includes a port transducer 555-5P and a starboard transducer 555-5S that are each fixed to arms for mounting propulsion motors to the airframe 515 in an aft region of the aerial vehicle 510. The port transducer 555-5P and the starboard transducer 555-5S are aligned substantially horizontally with respect to one another along an axis that is perpendicular to the forward orientation of the aerial vehicle 510, e.g., parallel to a lateral horizontal axis (or y-axis) of the aerial vehicle 510, and separated by a distance $L_5$. The ultrasonic anemometer 550-6 includes a port transducer 555-6P and a starboard transducer 555-6S that are each mounted to the airframe 515 on a forward side of the airframe 515. The port transducer 555-6P and the starboard transducer 555-6S are aligned substantially horizontally with respect to one another along an axis that is perpendicular to the forward orientation of the aerial vehicle 510, e.g., parallel to the lateral horizontal axis (or y-axis) of the aerial vehicle 510, and separated by a distance $L_6$.

In accordance with the present disclosure, the ultrasonic anemometers 550-1, 550-2, 550-3, 550-4, 550-5, 550-6 may be used to determine a net vector V corresponding to the relative velocity (e.g., both speeds and directions) of wind passing above, below or around the aerial vehicle 510.

For example, the ultrasonic anemometers 550-1, 550-2 may be used to independently determine redundant measures of the relative velocity $V_x$ of the wind in the forward or aft directions with respect to the longitudinal axis (or x-axis) of the aerial vehicle 510. Likewise, the ultrasonic anemometers 550-3, 550-4 may be used to independently determine redundant measures of the relative velocity $V_z$ of the wind in the vertical direction with respect to the vertical axis (or z-axis) of the aerial vehicle 510. Finally, the ultrasonic anemometers 550-5, 550-6 may be used to independently determine redundant measures of the relative velocity $V_y$ of the wind with respect to the lateral horizontal axis (or y-axis) of the aerial vehicle 510, e.g., port-to-starboard or starboard-to-port.

A net vector representative of the velocity V of the wind may be determined by vector addition or linear algebra principles, e.g., by adding the measures of the relative velocities $V_x$, $V_y$, V with respect to the longitudinal, lateral horizontal or vertical axes (e.g., x-, y- and z-axes) of the aerial vehicle 510. Once the net vector V has been determined, the net vector V may be used for any reason or operational basis, e.g., by operating one or more control surfaces or propulsion motors, as necessary, in order to ensure that the aerial vehicle 510 remains at a desired altitude, velocity over ground, or orientation about the longitudinal, lateral horizontal or vertical axes (e.g., yaw, pitch and/or roll angle).

In accordance with the present disclosure, an ultrasonic anemometer may have any number of transducers that are aligned in any configuration with respect to one another. Pairs of the transducers may be configured to transmit acoustic signals to one another, and receive acoustic signals from one another, and to determine air flow along axes or paths extending between such transducers. Such ultrasonic anemometers may be disposed in any discrete locations on an aerial vehicle, and information regarding elapsed times or transit times of acoustic signals between pairs of transducers may be used to determine the extent of localized air flow at the discrete locations, or aggregated to determine net air flows across the aerial vehicle.

Figure 6A:
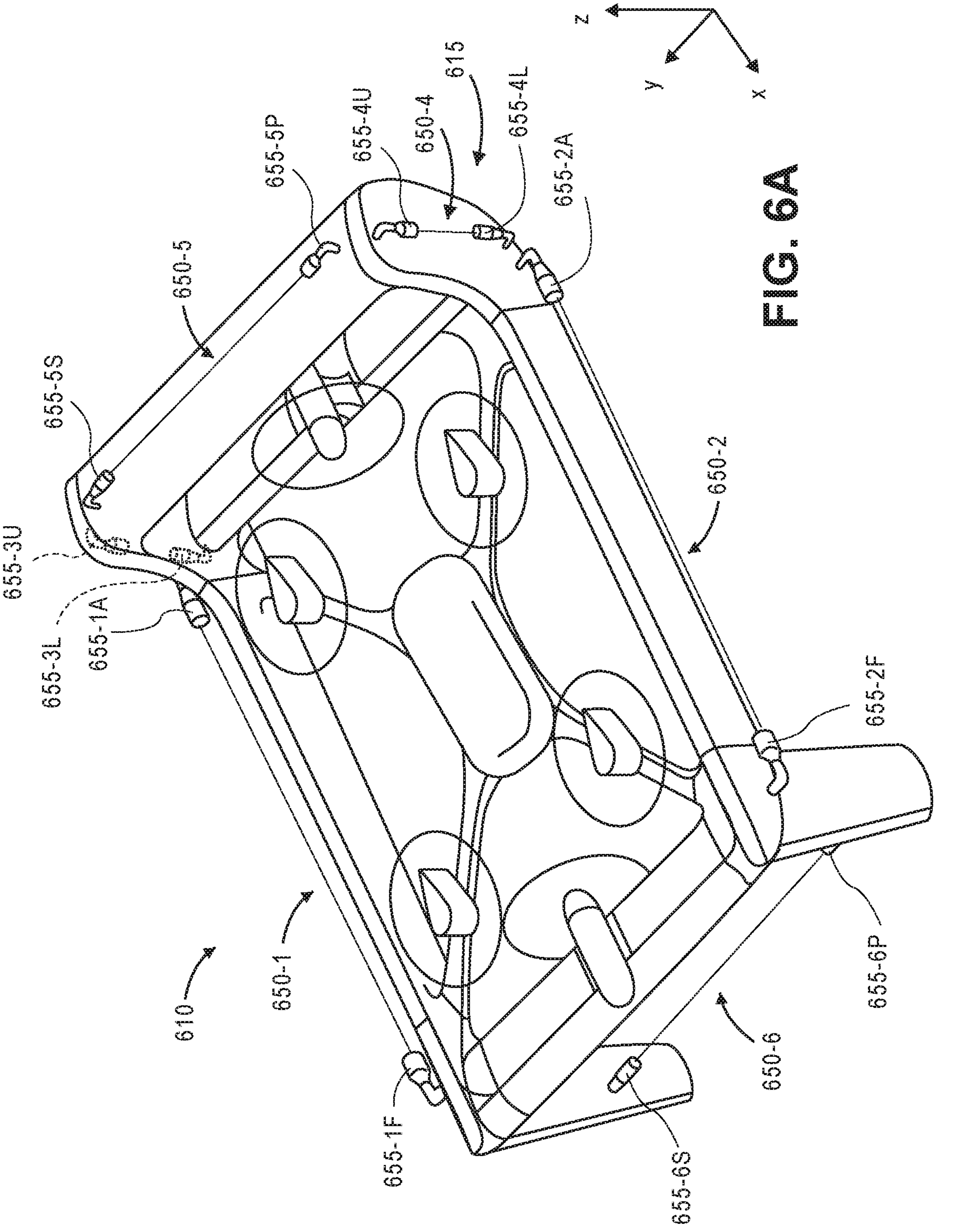
FIGS. 6A through 6C are views of aspects of an aerial vehicle having a plurality of ultrasonic anemometers in accordance with embodiments of the present disclosure.
Figure 6B:
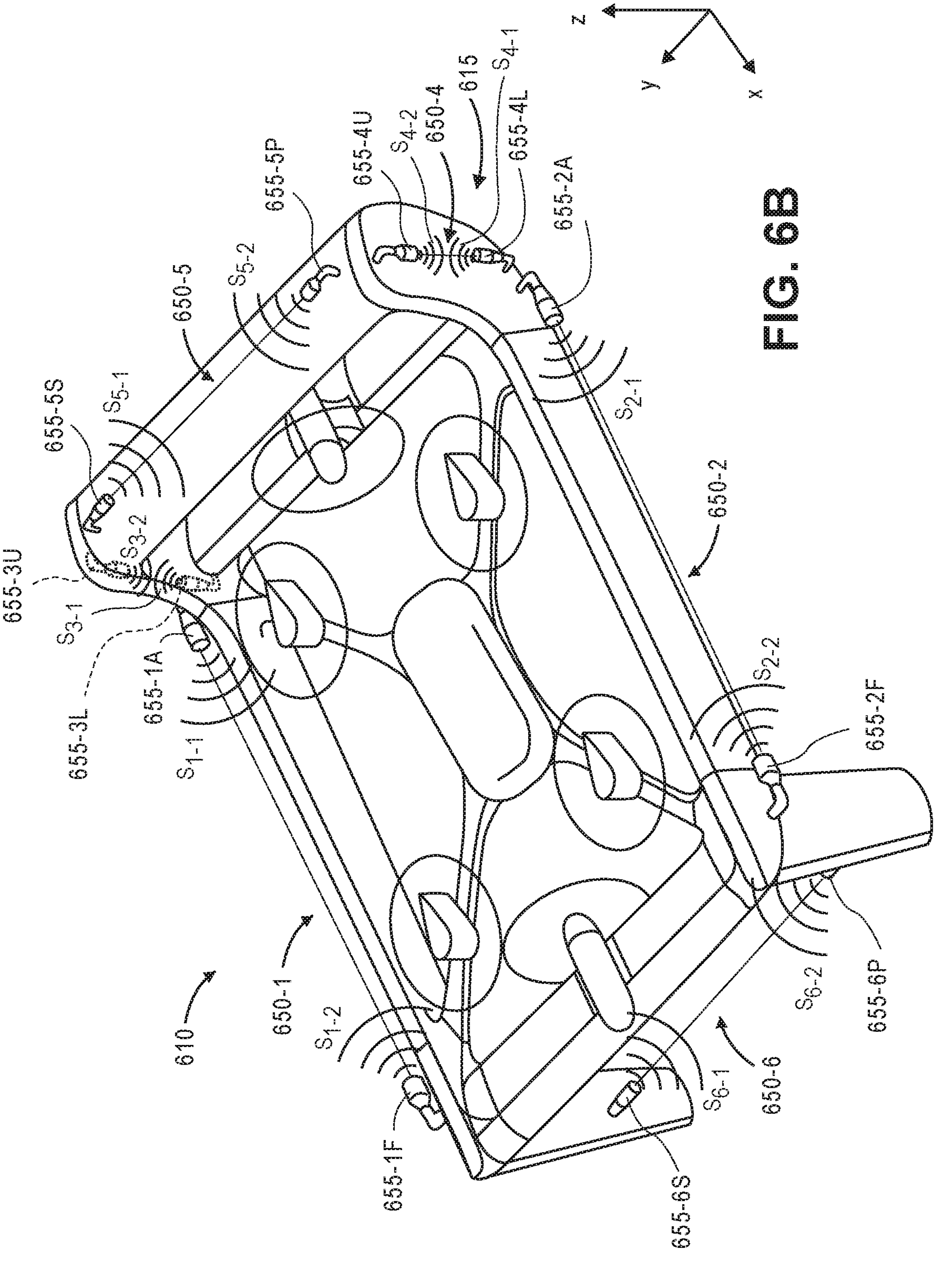
Figure 6C:
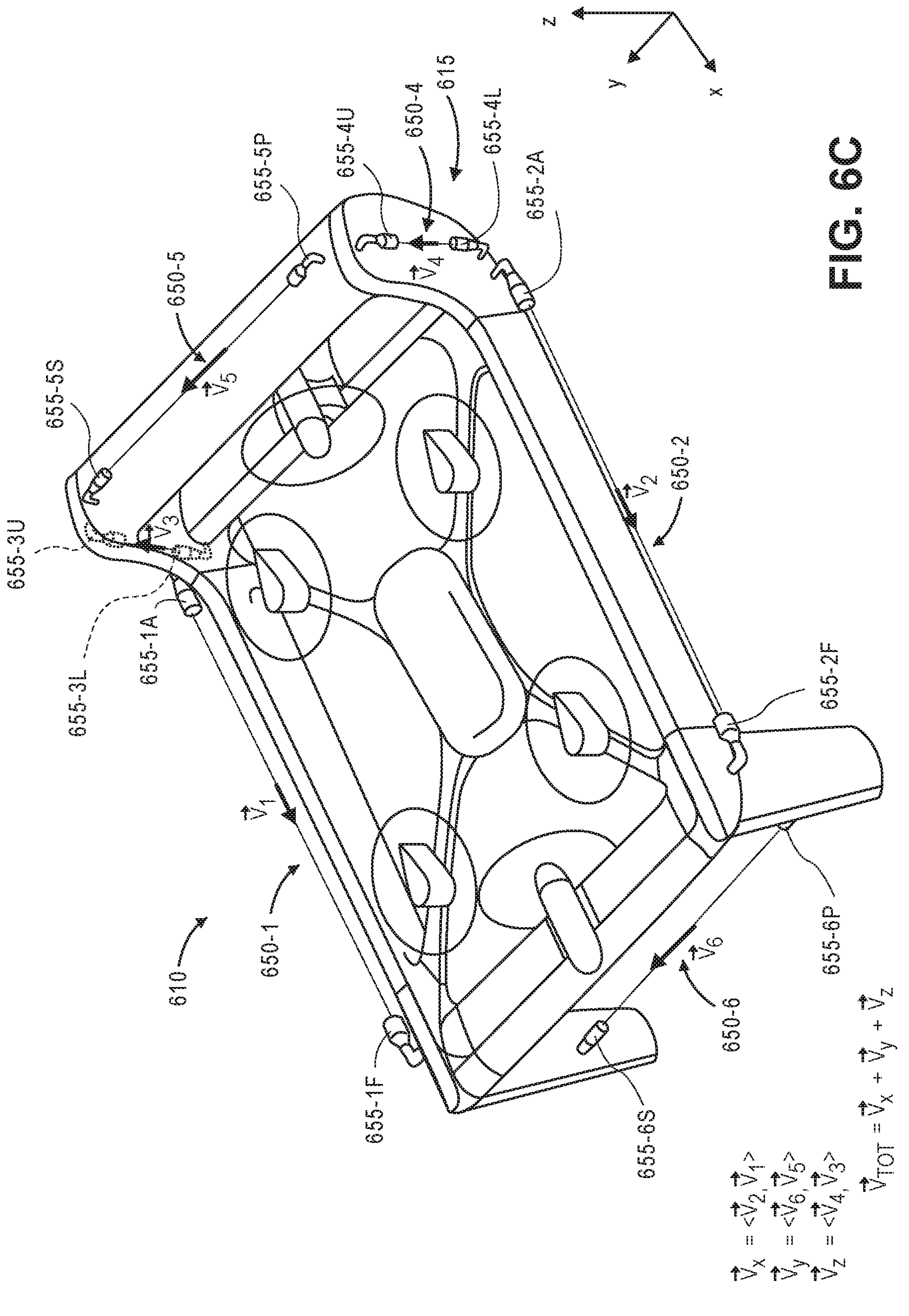

Referring to FIGS. 6A through 6C, a view of an aerial vehicle 610 having a plurality of ultrasonic anemometers in accordance with embodiments of the present disclosure is shown. Except where otherwise noted, reference numerals preceded by the number "6" shown in FIGS. 6A through 6C indicate components or features that are similar to components or features having reference numerals preceded by the number "5" shown in FIG. 5, by the number "4" shown in FIG. 4, by the number "2" shown in FIG. 2 or by the number "1" shown in FIGS. 1A through 1C.

As is shown in FIG. 6A, the aerial vehicle 610 includes an airframe 615 and a plurality of ultrasonic anemometers 650-1, 650-2, 650-3, 650-4, 650-5, 650-6 mounted thereto. Pairs of the ultrasonic anemometers 650-1, 650-2, 650-3, 650-4, 650-5, 650-6 are aligned in substantially orthogonal orientations throughout the aerial vehicle 610, in regions of the airframe where the distances between the transducers, along the x, y and z axes, may be substantially maximized. For example, the ultrasonic anemometer 650-1 includes a forward transducer 655-1F and an aft transducer 655-1A that are each fixed to the airframe 615 on a starboard side of the aerial vehicle 610, in a region having a substantially maximum length. The forward transducer 655-1F and the aft transducer 655-1A are aligned substantially horizontally with respect to one another along an axis that is parallel to a forward orientation of the aerial vehicle 610, e.g., parallel to a longitudinal axis (or x-axis) of the aerial vehicle 610, along a horizontal length of the airframe 615. The ultrasonic anemometer 650-2 includes a forward transducer 655-2F and an aft transducer 655-2A that are each fixed to the airframe 615 on a port side of the aerial vehicle 610, in another region having a substantially maximum length. The forward transducer 655-2F and the aft transducer 655-2A are aligned substantially horizontally with respect to one another along an axis that is parallel to the forward orientation of the aerial vehicle 610, e.g., parallel to the longitudinal axis (or x-axis) of the aerial vehicle 610, along the horizontal length of the airframe 615.

The ultrasonic anemometer 650-3 includes an upper transducer 655-3U and a lower transducer 655-3L that are each fixed to the airframe 615 on the starboard side of the aerial vehicle 610, e.g., in an aft region having a substantially maximum height. The upper transducer 655-3U and the lower transducer 655-3L are aligned substantially vertically with respect to one another along an axis that is perpendicular to the forward orientation of the aerial vehicle 610, e.g., parallel to a vertical axis (or z-axis) of the aerial vehicle 610, along a vertical height of the airframe 615. The ultrasonic anemometer 650-4 includes an upper transducer 655-4U and a lower transducer 655-4L that are each fixed to the airframe 615 on the port side of the aerial vehicle 610, e.g., in an aft region having a substantially maximum height. The upper transducer 655-4U and the lower transducer 655-4L are aligned substantially vertically with respect to one another along an axis that is perpendicular to the forward orientation of the aerial vehicle 610, e.g., parallel to the vertical axis (or z-axis) of the aerial vehicle 610, along a vertical height of the airframe 615.

The ultrasonic anemometer 650-5 includes a port transducer 655-5P and a starboard transducer 655-5S that are each fixed above a control surface in an aft region of the aerial vehicle 610. The port transducer 655-5P and the starboard transducer 655-5S are aligned substantially horizontally with respect to one another along an axis that is perpendicular to the forward orientation of the aerial vehicle 610, e.g., parallel to a lateral horizontal axis (or y-axis) of the aerial vehicle 610. The ultrasonic anemometer 650-6 includes a port transducer 655-6P and a starboard transducer 655-6S that are each fixed to control surfaces in a forward region of the aerial vehicle 610. The port transducer 655-6P and the starboard transducer 655-6S are aligned substantially horizontally with respect to one another along an axis that is perpendicular to the forward orientation of the aerial vehicle 610, e.g., parallel to the lateral horizontal axis (or y-axis) of the aerial vehicle 610.

The ultrasonic anemometers 650-1, 650-2, 650-3, 650-4, 650-5, 650-6 may be configured to transmit and receive acoustic signals between pairs of their respective transducers, in accordance with a predetermined sampling pattern, sequence or schedule. As is shown in FIG. 6B, the ultrasonic anemometers 650-1, 650-2 may be used to obtain independent measures of air velocity outboard of the aerial vehicle 610 in a direction parallel to the longitudinal axis (or x-axis) of the aerial vehicle 610, e.g., by transmitting and receiving acoustic signals $S_{1-1}$, $S_{1-2}$ between the forward transducer 655-1F and the aft transducer 655-1A, and by transmitting and receiving acoustic signals $S_{2-1}$, $S_{2-2}$ between the forward transducer 655-2F and the aft transducer 655-2A. The ultrasonic anemometers 650-3, 650-4 may be used to obtain independent measures of air velocity outboard of the aerial vehicle 610 in a direction parallel to the vertical axis (or x-axis) of the aerial vehicle 610, e.g., by transmitting and receiving acoustic signals $S_{3-1}$, $S_{3-2}$ between the upper transducer 655-3U and the lower transducer 655-3L, and by transmitting and receiving acoustic signals $S_{4-1}$, $S_{4-2}$ between the upper transducer 655-4U and the lower transducer 655-4L. The ultrasonic anemometers 650-5, 650-6 may be used to obtain independent measures of air velocity above and aft of the aerial vehicle 610, and below and forward of the aerial vehicle 610, respectively, e.g., by transmitting and receiving acoustic signals $S_{5-1}$, $S_{5-2}$ between the port transducer 655-5P and the starboard transducer 655-5S, and by transmitting and receiving acoustic signals $S_{6-1}$, $S_{6-2}$ between the port transducer 655-6P and the starboard transducer 655-6S.

Differences between the elapsed times or the transit times of the acoustic signals transmitted and received in opposite directions along paths or axes extending between each of the pairs of transducers may be used to determine air velocities along the respective paths or axes, which may be combined to determine a net air velocity of the aerial vehicle 610, e.g., by vector addition or linear algebra techniques. As is shown in FIG. 6C, independent measures of air velocity $V_1$, $V_2$ outboard of the aerial vehicle 610 in a direction of the longitudinal axis (e.g., x-axis) may be determined based on differences in elapsed times or transit times of the acoustic signals $S_{1-1}$, $S_{1-2}$ and the acoustic signals $S_{2-1}$, $S_{2-2}$, respectively. Independent measures of air velocity $V_3$, $V_4$ outboard of the aerial vehicle 610 in a direction of the vertical axis (e.g., z-axis) may be determined based on differences in elapsed times or transit times of the acoustic signals $S_{3-1}$, $S_{3-2}$ and the acoustic signals $S_{3-1}$, $S_{3-2}$, respectively. Independent measures of air velocity $V_5$, $V_6$ aft and above the aerial vehicle 610 or forward and below the aerial vehicle 610, respectively, in a direction of the lateral horizontal axis (e.g., y-axis) may be determined based on differences in elapsed times or transit times of the acoustic signals $S_{5-1}$, $S_{5-2}$ and the signals $S_{6-1}$, $S_{6-2}$, respectively.

The measures of air velocity $V_1$, $V_2$, $V_3$, $V_4$, $V_5$, $V_6$ along the x-, y- and z-axes may be combined and used to determine a net air velocity vector $V_{TOT}$ in any manner. For example, average air velocities $V_x$, $V_y$, $V_z$ along each of the respective axes may be determined and summed in order to arrive at the net air velocity vector $V_{TOT}$.

Ultrasonic anemometers may be provided as discrete units disposed on external surfaces of aerial vehicles, in order to determine localized air velocities at specific locations on such surfaces, or to determine a net velocity of air passing above, below or around the aerial vehicle. Referring to FIGS. 7A through 7D, views of aspects of an aerial vehicle having a plurality of ultrasonic anemometers in accordance with embodiments of the present disclosure are shown. Except where otherwise noted, reference numerals preceded by the number "6" shown in FIGS. 7A through 7D indicate components or features that are similar to components or features having reference numerals preceded by the number "6" shown in FIGS. 6A through 6C, by the number "5" shown in FIG. 5, by the number "4" shown in FIG. 4, by the number "2" shown in FIG. 2 or by the number "1" shown in FIGS. 1A through 1C.

Figure 7A:
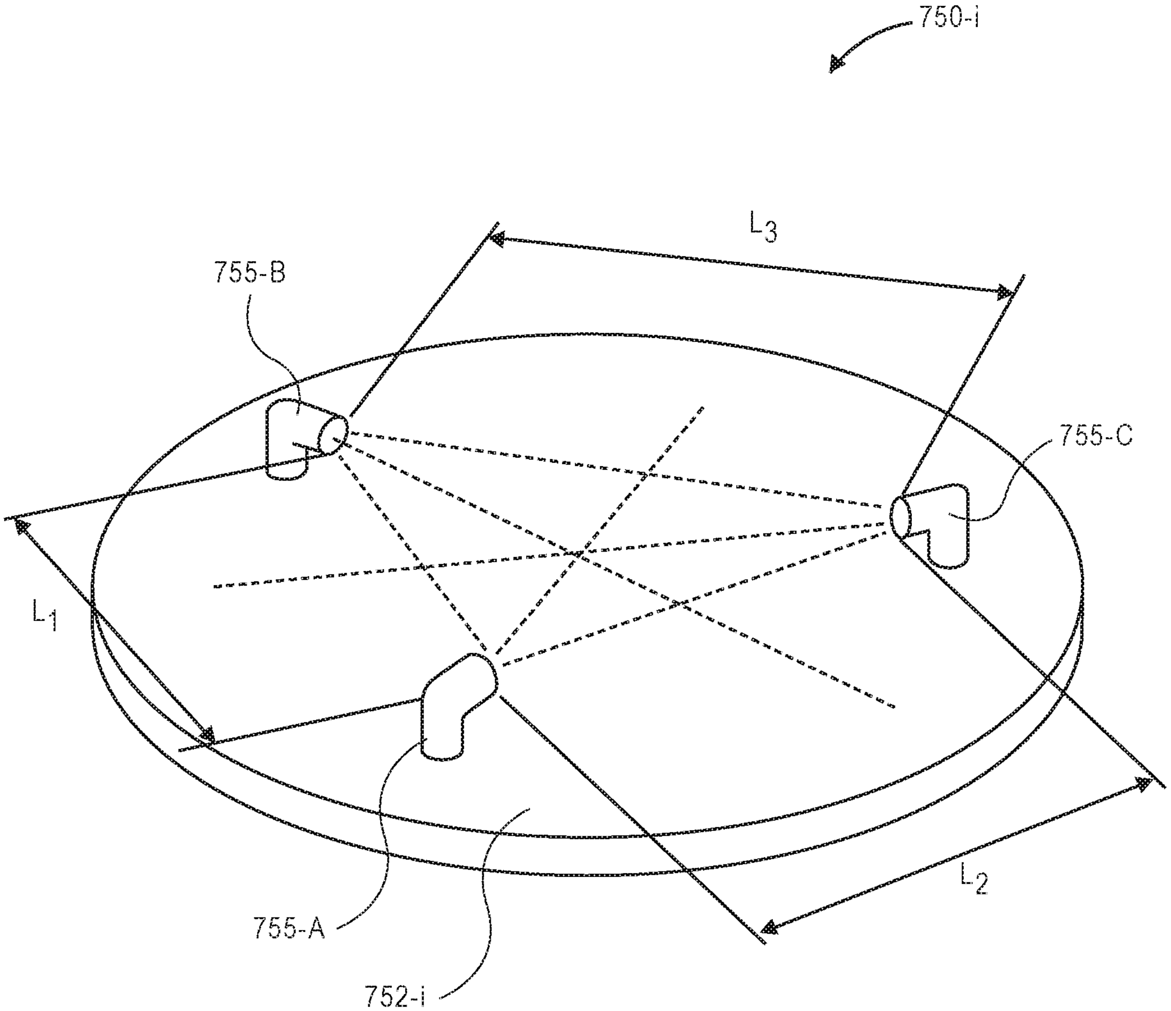
FIGS. 7A through 7D are views of aspects of an aerial vehicle having a plurality of ultrasonic anemometers in accordance with embodiments of the present disclosure.

As is shown in FIG. 7A, an ultrasonic anemometer 750-*i* includes a disc or plate-like element 752-*i* having a plurality of transducers 755-A, 755-B, 755-C disposed thereon. The transducers 755-A, 755-B, 755-C are substantially evenly distributed throughout the disc 752-*i*, such that the transducers 755-A, 755-B, 755-C are angularly separated by approximately one hundred twenty degrees (120°) about a circumference of the disc 752-*i*. Additionally, as is also shown in FIG. 7A, the transducer 755-A and the transducer 755-B are linearly separated by a distance $L_1$, while the transducer 755-A and the transducer 755-C are linearly separated by a distance $L_2$, and the transducer 755-B and the transducer 755-C are linearly separated by a distance $L_3$.

Figure 7B:
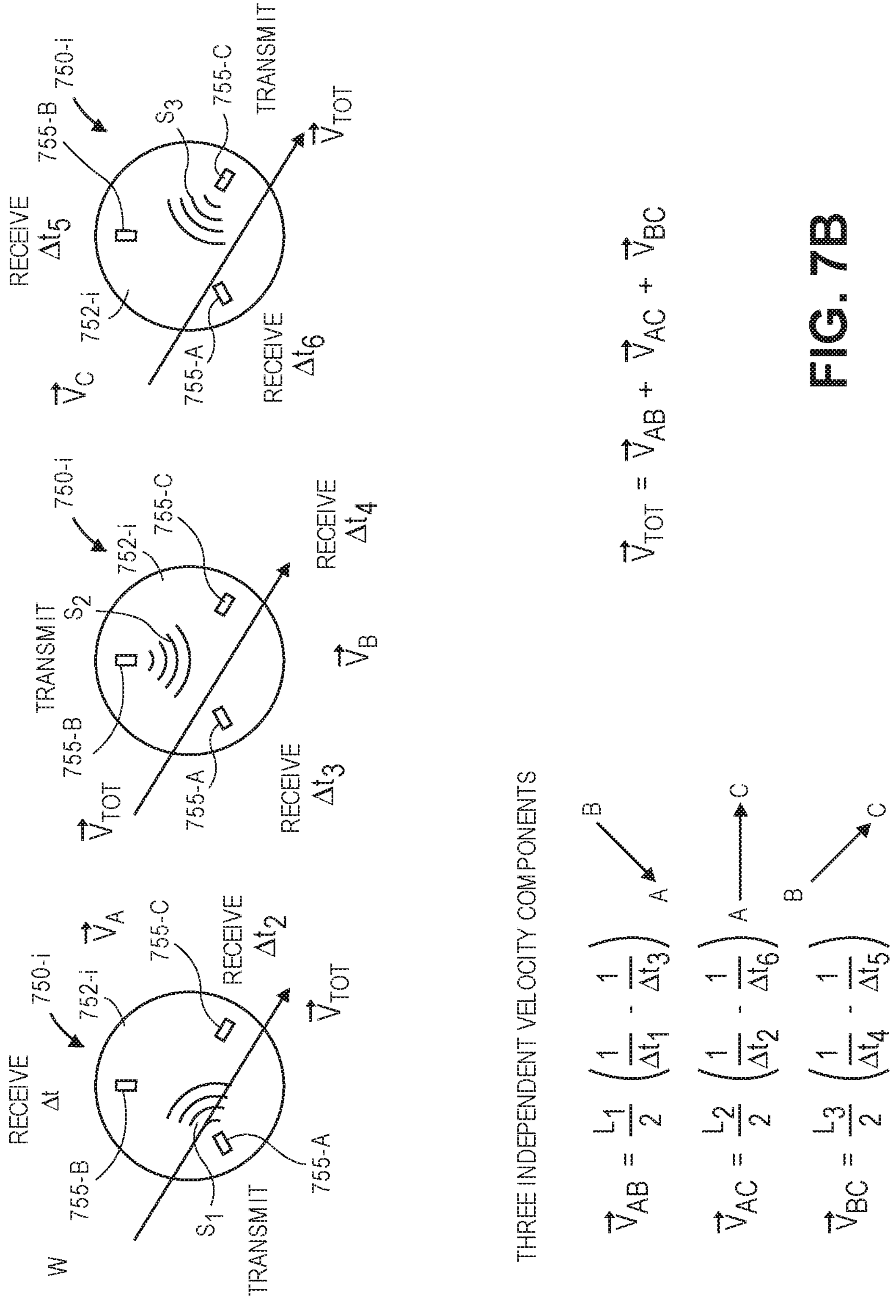

Each of the transducers 755-A, 755-B, 755-C is oriented inwardly, toward a center of the disc 752-*i*, such that each of the transducers 755-A, 755-B, 755-C is aligned to transmit acoustic signals having any width or spread, and any frequency or interval, to each of the other transducers, and to receive acoustic signals from each of the other transducers. An extent of beam spread or beam divergence may depend on any number of factors, including the acoustic properties of the medium into which the acoustic energy is emitted, a width or radius of the face of the transducer, a frequency or interval, or others. As is shown in FIG. 7B, the transducer 755-A transmits a first acoustic signal $S_1$ toward the transducer 755-B and the transducer 755-C. An elapsed time $\Delta t_1$ between the transmission of the first acoustic signal $S_1$ by the transducer 755-A and the receipt of the first acoustic signal $S_1$ by the transducer 755-B, and an elapsed time $\Delta t_2$ between the transmission of the first acoustic signal $S_1$ by the transducer 755-A and the receipt of the first acoustic signal $S_1$ by the transducer 755-C, are determined.

Similarly, the transducer 755-B transmits a second acoustic signal $S_2$ toward the transducer 755-A and the transducer 755-C. The second acoustic signal $S_2$ may be transmitted after the receipt of the first acoustic signal $S_1$ by both of the transducer 755-A and the transducer 755-B is confirmed, or in accordance with a predetermined sampling pattern, sequence or schedule. An elapsed time $\Delta t_3$ between the transmission of the second acoustic signal $S_2$ by the transducer 755-B and the receipt of the second acoustic signal $S_2$ by the transducer 755-A, and an elapsed time $\Delta t_4$ between the transmission of the second acoustic signal $S_2$ by the transducer 755-B and the receipt of the second acoustic signal $S_2$ by the transducer 755-C, are determined. Likewise, the transducer 755-C transmits a third acoustic signal $S_3$ toward the transducer 755-A and the transducer 755-B, e.g., after the receipt of the second acoustic signal $S_2$ is confirmed, or in accordance with a predetermined sampling pattern, sequence or schedule. An elapsed time $\Delta t_5$ between the transmission of the third acoustic signal $S_3$ by the transducer 755-C and the receipt of the third acoustic signal $S_3$ by the transducer 755-A, and an elapsed time $\Delta t_6$ between the transmission of the third acoustic signal $S_3$ by the transducer 755-C and the receipt of the third acoustic signal $S_3$ by the transducer 755-B, are determined.

Using the elapsed times between the transmission of the respective acoustic signals and their receipt by pairs of transducers, speed components of the air flow between such pairs may be determined and combined, e.g., by vector addition or linear algebra techniques, to determine a net vector of the air flow. As is shown in FIG. 7B, a relative speed $V_{AB}$ of the air flow along a path between the transducer 755-A and the transducer 755-B may be determined based on the elapsed times $\Delta t_1$ and $\Delta t_3$, and the distance $L_1$. A relative speed $V_{AC}$ of the air flow along a path between the transducer 755-A and the transducer 755-3 may be determined based on the elapsed times $\Delta t_2$ and $\Delta t_6$, and the distance $L_2$. A relative speed $V_{BC}$ of the air flow along a path between the transducer 755-B and the transducer 755-3 may be determined based on the elapsed times $\Delta t_4$ and $\Delta t_5$, and the distance $L_3$. Therefore, a vector representative of the total air flow $V_{TOT}$ passing through the ultrasonic anemometer 750-*i* may be determined by adding the relative speeds of the air flow $V_{AB}$, $V_{AC}$, $V_{BC}$.

Figure 7C:
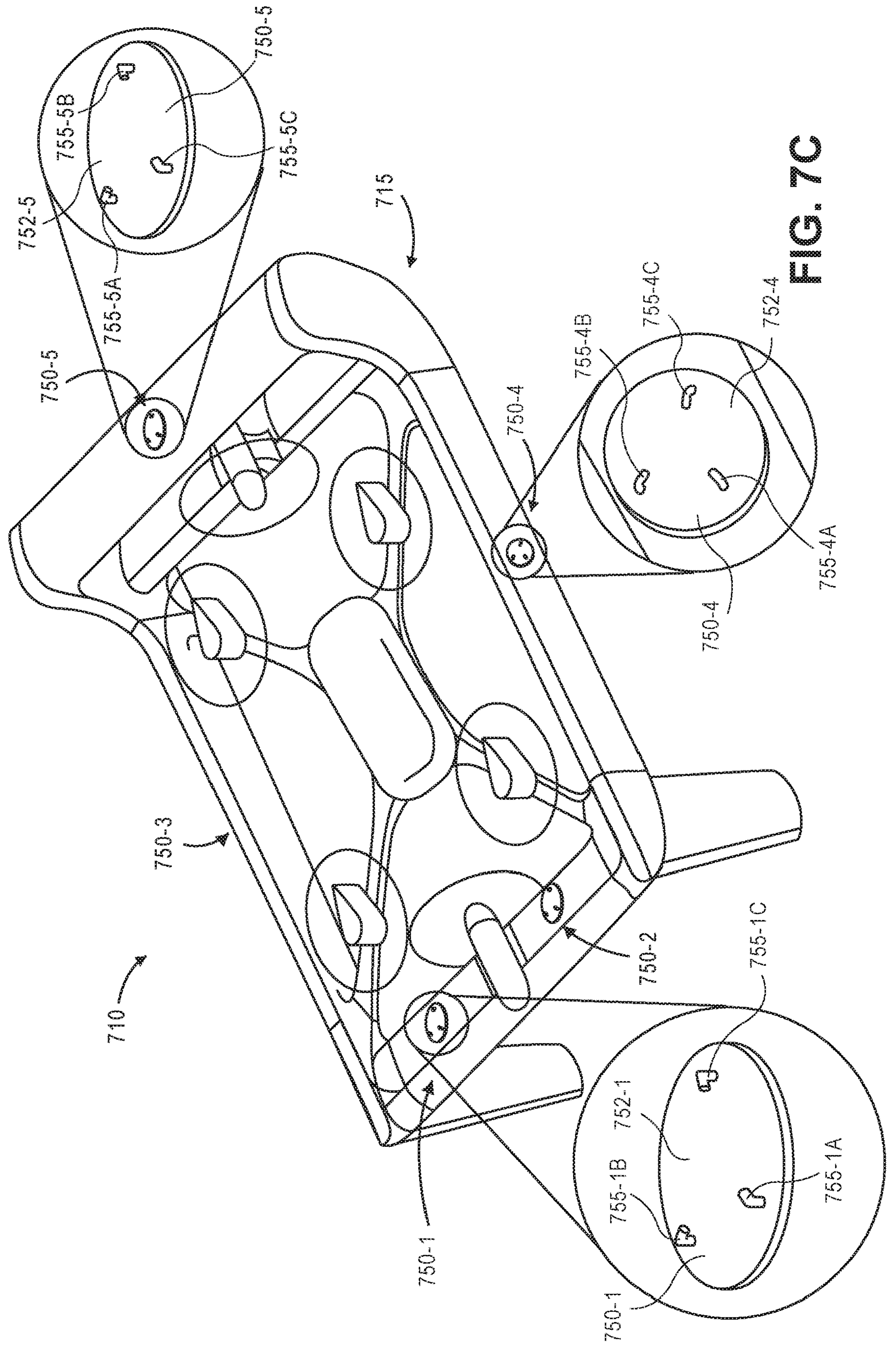

As is discussed above, a plurality of ultrasonic transducers, such as the ultrasonic transducer 750-*i*, may be mounted in discrete locations on an airframe of an aerial vehicle and used to determine air flow along the airframe at such locations. Referring to FIG. 7C, an aerial vehicle 710 includes an airframe 715 having a plurality of the ultrasonic anemometers 750-*i* of FIG. 7A mounted thereto. In particular, the aerial vehicle 710 includes a pair of ultrasonic anemometers 750-1, 750-2 mounted on upper faces of a forward fixed control surface, and a pair of ultrasonic anemometers 750-3, 750-4 mounted on outer faces on the starboard and port sides, respectively, of the aerial vehicle 710. The aerial vehicle 710 further includes an ultrasonic anemometer 750-5 mounted on an upper face of an aft fixed control surface.

Each of the ultrasonic anemometers 750-1, 750-2, 750-3, 750-4, 750-5 includes a plurality of transducers aligned in a manner similar to that which is shown in FIG. 7A. For example, as is shown in FIG. 7C, the ultrasonic anemometer 750-1 includes a disc or plate-like element 752-1 having a plurality of transducers 755-1A, 755-1B, 755-1C disposed thereon, substantially evenly distributed throughout the disc 752-1, and angularly separated by approximately one hundred twenty degrees (120°) about a circumference of the disc 752-1. Likewise, as is also shown in FIG. 7C, the ultrasonic anemometers 750-4, 750-5 include discs or plate-like elements 752-4, 752-5, and pluralities of transducers 755-4A, 755-4B, 755-4C and 755-5A, 755-5B, 755-5C disposed thereon, substantially evenly distributed throughout the discs 752-4, 752-5, and angularly separated by approximately one hundred twenty degrees (120°) about circumferences of the disc 752-4, 752-5. The ultrasonic anemometers 750-2, 750-3 include discs and transducers that are similarly arranged thereon.

Figure 7D:
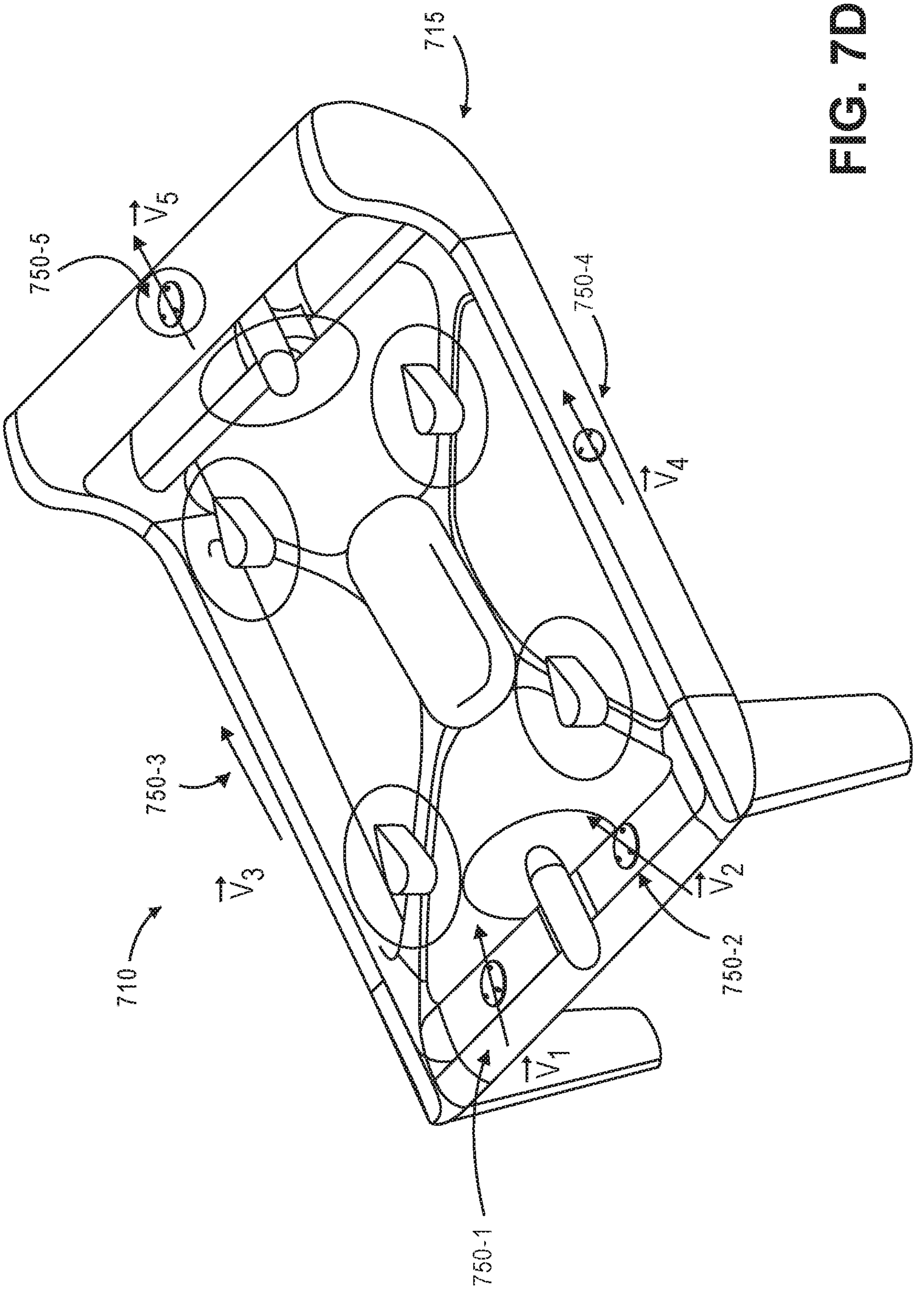

Each of the ultrasonic anemometers 750-1, 750-2, 750-3, 750-4, 750-5 may be configured to determine a localized air flow at the discrete locations on the airframe 715 to which the anemometers 750-1, 750-2, 750-3, 750-4, 750-5 are disposed. In some embodiments, the ultrasonic anemometers may be of a modular or movable configuration, and may be selectively installed at or removed from one or more of the discrete locations when information or data regarding the localized air flow at such locations is desired. Referring to FIG. 7D, vectors $V_1$, $V_2$, $V_3$, $V_4$, $V_5$ corresponding to air flows at the respective locations of the anemometers 750-1, 750-2, 750-3, 750-4, 750-5 on the airframe 715 are shown. Information or data regarding the respective air flows may be utilized for any purpose, including but not limited to exercising control of the aerial vehicle 710, or operating propulsion motors and/or control surfaces to maintain the aerial vehicle 710 at a desired altitude, velocity over ground, or orientation about its principal axes (e.g., yaw, pitch and/or roll angle).

An aerial vehicle equipped with an ultrasonic anemometer having multiple transducers may be configured to continuously determine and update air flow parameters in accordance with a sampling pattern (or sequence or schedule), such that the transducers repeatedly transmit acoustic signals to one another according to the sampling pattern, and parameters of air flow passing above, below or around the aerial vehicle are updated accordingly based on the transit times of such acoustic signals between pairs of the transducers. The acoustic signals may include one or more pulses of any frequency or duration. Once information regarding the air flow is determined, such information may be utilized to make any operational changes or determinations regarding the aerial vehicle accordingly, including but not limited to operating one or more propulsion motors and/or control surfaces.

Figure 8:
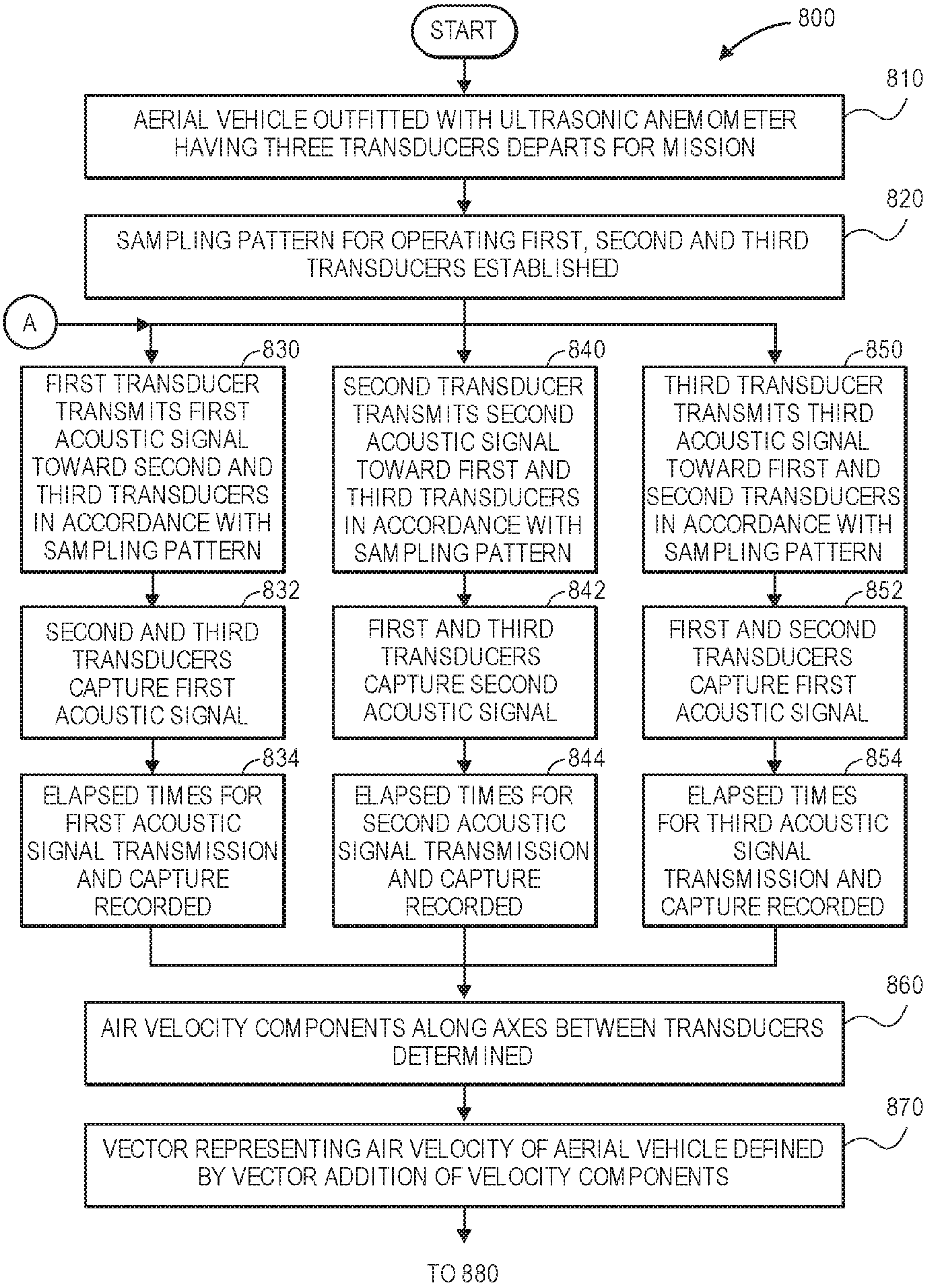
FIG. 8 is a flow chart of one process for operating an aerial vehicle having an ultrasonic anemometer in accordance with embodiments of the present disclosure.
Figure 8:
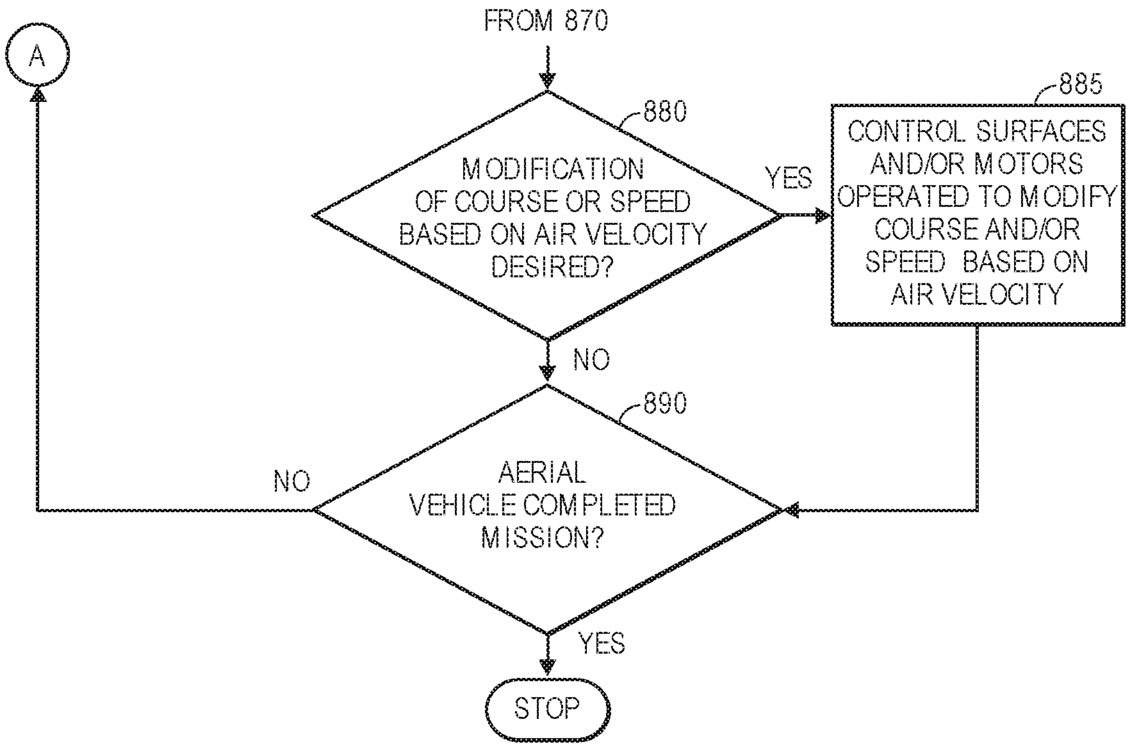

Referring to FIG. 8, a flow chart 800 of one process for operating an aerial vehicle having an ultrasonic anemometer in accordance with embodiments of the present disclosure is shown. At box 810, an aerial vehicle that is outfitted with an ultrasonic anemometer having three transducers departs for a mission. The transducers may be disposed in any angular orientation or configuration, such as the substantially triangular configuration of the transducers 755-A, 755-B, 755-C of the ultrasonic anemometer 750-*i* of FIG. 7A. At box 820, a sampling pattern for operating the first transducer, the second transducer and the third transducer is established. For example, the sampling pattern may establish absolute or relative timing for the transmission of acoustic signals by the respective transducers, which may be set in accordance with a fixed schedule, or with regard to the confirmed receipt of acoustic signals previously transmitted by other transducers. The sampling pattern may also take into considerations one or more external operational or environmental factors or conditions in order to maximize a likelihood that an acoustic signal transmitted by one transducer is received and interpreted by one or more other transducers. The sampling pattern may also define the frequencies or frequency spectra of the respective acoustic signals, the durations of such signals, or times separating each of the respective signals.

Thereafter, the transducers may transmit acoustic signals to one another, and receive acoustic signals from one another, in parallel and in accordance with the sampling pattern. At box 830, the first transducer transmits a first acoustic signal toward the second transducer and the third transducer in accordance with the sampling pattern established at box 820. The first acoustic signal may be or include one or more pulses of any frequency and duration. At box 832, the second transducer and third transducer capture the first acoustic signal, and at box 834, elapsed times for the transmission and capture of the first acoustic signal are determined. The ultrasonic anemometer may include or be associated with one or more computer systems that may be configured to filter ambient noise or other signals from acoustic data captured by the respective transducers, in order to maximize the likelihood that the first acoustic signal is recognized within acoustic data captured by the second transducer and the third transducer.

Similarly, at box 840, the second transducer transmits a second acoustic signal toward the first transducer and the third transducer in accordance with the sampling pattern. As with the first acoustic signal, the second acoustic signal may be or include one or more pulses of any frequency and duration, and the pulses of the second acoustic signal need not be of the same frequency or duration as the pulses of the first acoustic signal. At box 842, the first transducer and the third transducer capture the second acoustic signal, and at box 844, the elapsed times for the second acoustic signal transmission and capture are recorded. At box 850, the third transducer transmits a third acoustic signal toward the first transducer and the second transducer in accordance with the sampling pattern. The third acoustic signal may be or include one or more pulses of any frequency or duration, and such pulses need not be of the same frequency or duration as any of the pulses of the first acoustic signal or the second acoustic signal. At box 852, the first transducer and the second transducer capture the third acoustic signal, and at box 854, elapsed times for the third acoustic signal transmission and capture are recorded.

At box 860, the air velocity components along the axes between each of the pairs of transducers are determined based on the respective transit times. For example, referring again to FIG. 4, velocity along an axis or a path between each of the pairs of transducers may be determined as functions of a distance between the pairs and the elapsed times of acoustic signals transmitted and received by the respective transducers of the pairs. At box 870, a vector representing air velocity of the aerial vehicle is defined by vector addition of the velocity components determined at box 860.

At box 880, whether a modification of a course or a speed is desired based on the vector representing the air velocity may be determined. For example, if the air velocity indicates that the aerial vehicle is traveling at insufficient speeds or is deviating from an intended or desired course, one or more corrections may be implemented by operation of one or more propulsion motors and/or control surfaces. Alternatively, modifications to an altitude or an orientation of the aerial vehicle about its principal axes (e.g., yaw, pitch and/or roll angle) may also be considered.

If a modification to the course or speed is desired, then the process advances to box 885, where the control surfaces and/or motors are modified based on the air velocity determined at box 870. If no modifications to either the course or the speed are desired, or after such modifications are implemented, the process advances to box 890, where it is determined whether the aerial vehicle has completed the mission that was begun at box 810. If the aerial vehicle has completed the mission, then the process ends. If the aerial vehicle has not completed the mission, however, then the process returns to boxes 830, 840 and 850, where the first transducer, the second transducer and the third transducer transmit a first acoustic signal, a second acoustic signal and a third acoustic signal, respectively, in accordance with the sampling pattern.

Determinations of air speed and direction made using ultrasonic anemometers of the present disclosure may be utilized to automatically implement one or more changes to an aerial vehicle's course, speed, altitude or orientation, regardless of whether the aerial vehicle is operating in a forward or horizontal flight mode, a vertical flight mode, or a hovering flight mode. For example, where an ultrasonic anemometer embedded in an airframe of a hovering aerial vehicle detects a gust of wind, the aerial vehicle may automatically reconfigure itself, e.g., by the operation of one or more propulsion motors or control surfaces, in order to counteract forces imparted upon the aerial vehicle by the wind.

Figure 9A:
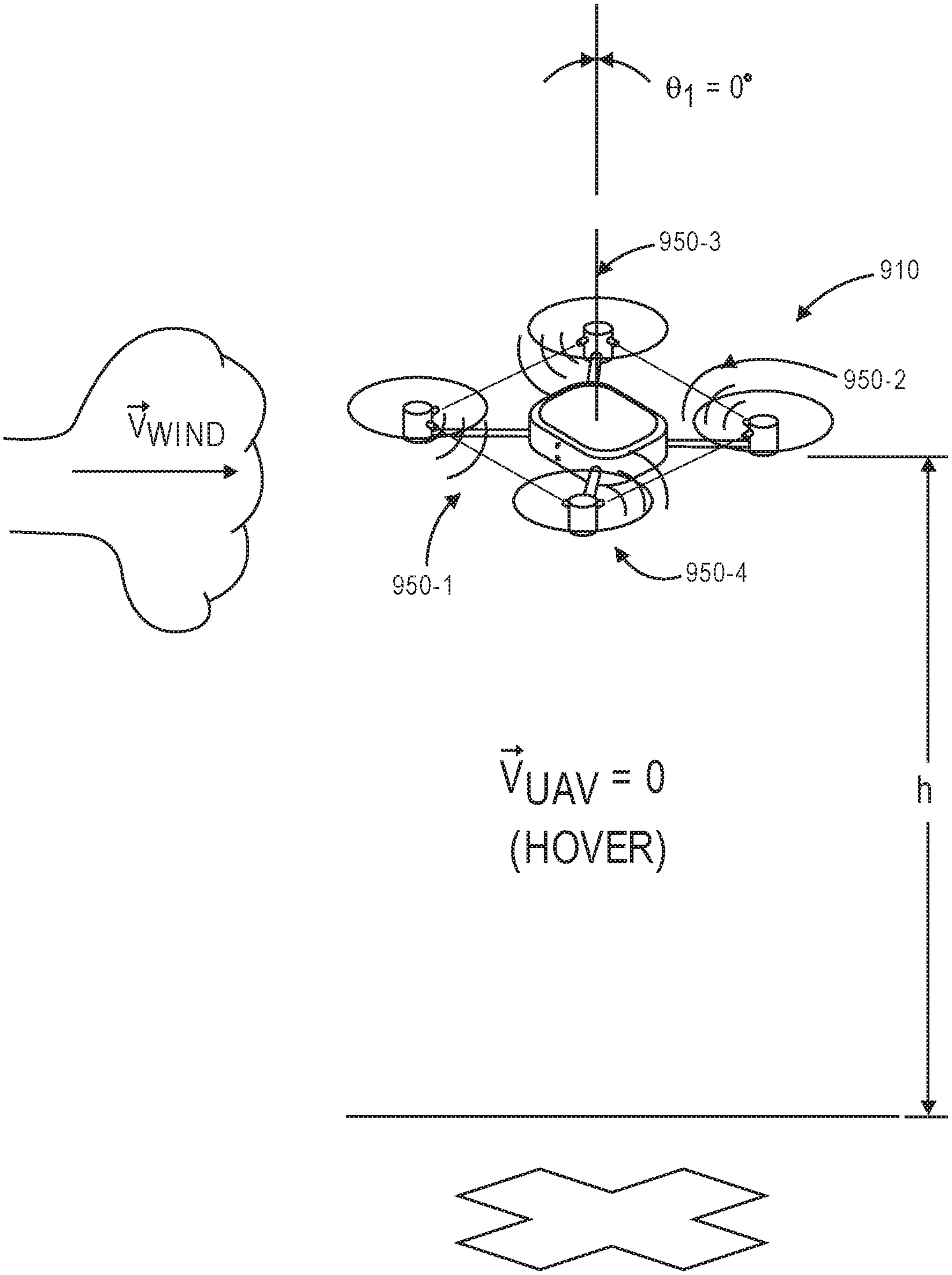
FIGS. 9A and 9B are views of an aerial vehicle having an airframe with an ultrasonic anemometer embedded therein in accordance with embodiments of the present disclosure.
Figure 9B:
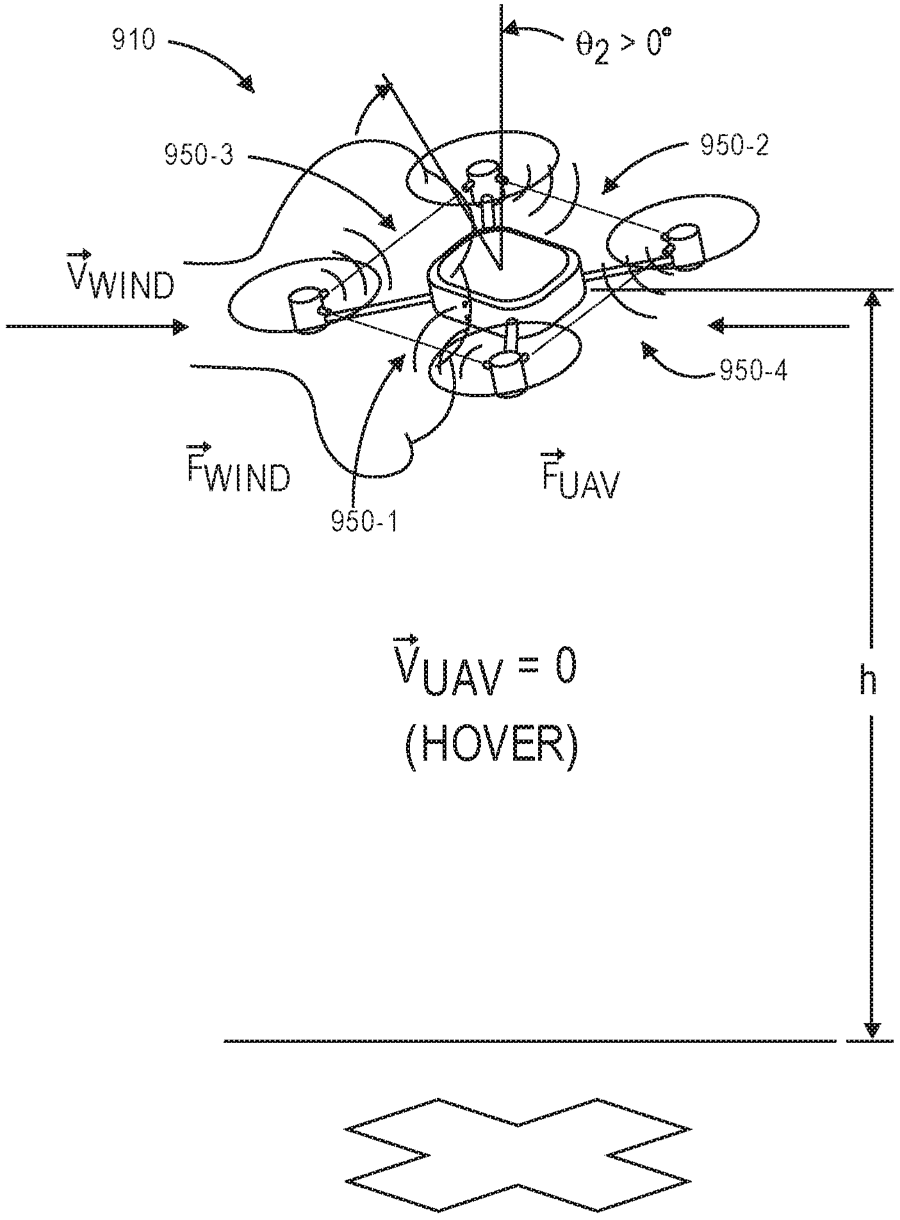

Referring to FIGS. 9A and 9B, views of an aerial vehicle 910 having an airframe with an ultrasonic anemometer embedded therein in accordance with embodiments of the present disclosure are shown. Except where otherwise noted, reference numerals preceded by the number "9" shown in FIGS. 9A and 9B indicate components or features that are similar to components or features having reference numerals preceded by the number "7" shown in FIGS. 7A through 7D, by the number "6" shown in FIGS. 6A through 6C, by the number "5" shown in FIG. 5, by the number "4" shown in FIG. 4, by the number "2" shown in FIG. 2 or by the number "1" shown in FIGS. 1A through 1C.

As is shown in FIG. 9A, the aerial vehicle 910 includes a plurality of ultrasonic anemometers 950-1, 950-2, 950-3, 950-4, each comprising at least a pair of transducers oriented to transmit and receive acoustic signals along an axis or path between them. The ultrasonic anemometers 950-1, 950-2, 950-3, 950-4 are mounted at forward, aft, port and starboard sides of the aerial vehicle 910, and configure to determine air speeds along the axes or paths extending between the transducers on all sides. The aerial vehicle 910 is shown in FIG. 9A as hovering at a constant altitude, and with a net velocity $V_{UAV}$ of zero. The aerial vehicle 910 is oriented at a vertical angle $\theta_1$ of zero degrees (0°), or with no deviation from a normal orientation.

In accordance with the present disclosure, ultrasonic anemometers may be configured to sense air speed information, including but not limited to changes in air flow above, below or around an aerial vehicle, and utilize such air speed information to exercise control over a course, a speed, an altitude or an orientation of the aerial vehicle accordingly. For example, when wind conditions around an aerial vehicle change, the aerial vehicle may be configured to recognize such changes using one or more ultrasonic anemometers, and to generate control signals for maintaining the aerial vehicle on a desired course, at a desired speed or altitude, or in a desired orientation. As is shown in FIG. 9B, when a gust of wind at a speed $V_{WIND}$ contacts the aerial vehicle 910 and imparts a force $F_{WIND}$ on the aerial vehicle, the ultrasonic anemometers 950-1, 950-2, 950-3, 950-4 may sense a change in the wind conditions in one or more directions around the aerial vehicle 910. Subsequently, one or more control systems aboard the aerial vehicle 910 may generate control signals for causing the propulsion motors and/or control surfaces on the aerial vehicle 910 to generate a force $F_{UAV}$ that counteracts the force $F_{WIND}$ imparted upon the aerial vehicle 910 by the wind, in order to maintain the aerial vehicle 910 hovering at the desired altitude and at a net velocity $V_{UAV}$ of zero. For example, the aerial vehicle 910 may reduce the operating speed of one or more of the propulsion motors, increase the operating speed of other propulsion motors, and cause a change in the vertical angle $\theta_2$ of the aerial vehicle 910, with a positive deviation from a normal orientation. Subsequently, as the gust of wind dissipates (not shown), the anemometers 950-1, 950-2, 950-3, 950-4 may sense a change in the wind conditions again, and may generate control signals for causing the aerial vehicle 910 to revert to a zero-degree vertical angle, or to act in any other manner in response to the change.

Figure 10B:
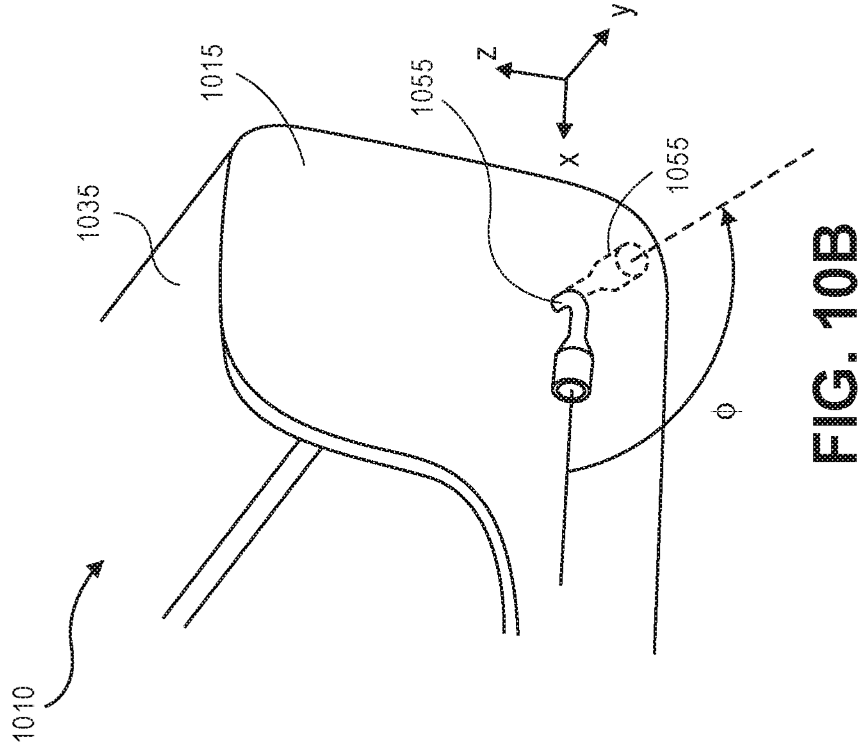
FIGS. 10A and 10B are views of aspects of an ultrasonic transducer in accordance with embodiments of the present disclosure.
Figure 10A:
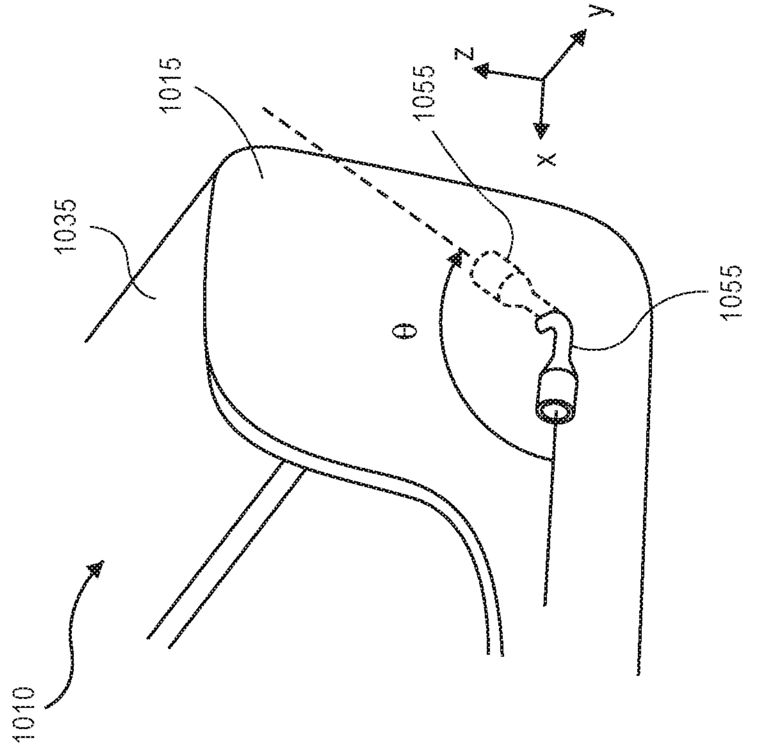

As is discussed above, the transducers of the present disclosure may be configured to change their respective angles of orientation, e.g., by rotating or pivoting the transducers about one or more axes, thereby enabling the transducers to be utilized for one or more purposes and to be operated in one or more different modes, in accordance with a sampling pattern (or sequence or schedule. Referring to FIGS. 10A and 10B, views of aspects of one ultrasonic transducer in accordance with embodiments of the present disclosure are shown. Except where otherwise noted, reference numerals preceded by the number "10" shown in FIGS. 10A and 10B indicate components or features that are similar to components or features having similar reference numerals preceded by the number "9" shown in FIGS. 9A and 9B, by the number "7" shown in FIGS. 7A through 7D, by the number "6" shown in FIGS. 6A through 6C, by the number "5" shown in FIG. 5, by the number "4" shown in FIG. 4, by the number "2" shown in FIG. 2 or by the number "1" shown in FIGS. 1A through 1C.

As is shown in FIG. 10A, an aerial vehicle 1010 includes an airframe 1015 and a fixed control surface 1035, with an ultrasonic transducer 1055 mounted to the airframe 1015, e.g., by a rotatable mount. The ultrasonic transducer 1055 is shown as aligned in a forward direction, and is configured to rotate or pivot about a first axis defined by the rotatable mount that is parallel to a lateral horizontal axis of the aerial vehicle 1010 by one or more motors, hinges or like components. Thus, the ultrasonic transducer 1055 may be aligned at any angle of orientation θ about the first axis, as may desired or required in order to conduct any relevant operations using the ultrasonic transducer 1055. For example, where the ultrasonic transducer 1055 is aligned along a common path or axis with another ultrasonic transducer and in opposite directions, the ultrasonic transducer 1055 may be used to determine air speeds along the common path or axis using anemometry principles, e.g., based on differences between times in flight of acoustic signals transmitted between pairs of ultrasonic transducers in the presence of air flow.

After the ultrasonic transducer 1055 has been used to determine an air speed along the common path or axis, the ultrasonic transducer 1055 may be rotated or pivoted about the first axis defined by the rotatable mount or otherwise repositioned to the angle of orientation θ and utilized for another purpose or operated in a different mode, e.g., depth ranging, object recognition or collision avoidance, or in any other manner. In some embodiments, the ultrasonic transducer 1055 may then be returned to its original alignment and used to determine another air speed along the common path or axis, before being reoriented again and utilized for any other purpose or operated in any other mode.

Similarly, as is shown in FIG. 10B, the ultrasonic transducer 1055 is shown as aligned in the forward direction, and is configured to rotate or pivot about a second axis defined by the rotatable mount that is parallel to a vertical axis of the aerial vehicle 1010 by one or more motors, hinges or like components. Thus, the ultrasonic transducer 1055 may be aligned at any angle of orientation ϕ about the second axis, as may be desired or required in order to conduct any relevant operations using the ultrasonic transducer 1055, including not only determining air speeds along a common axis according to anemometry but also engaging in depth ranging, object recognition, collision avoidance or other modes of operation.

Transducers such as the ultrasonic transducer 1055 of FIGS. 10A and 10B may be reconfigured, reoriented, rotated, repositioned or pivoted for any reason and on any basis. For example, referring again to the ultrasonic anemometer 750-*i* of FIG. 7A, one or more of the plurality of transducers 755-A, 755-B, 755-C may be rotated or pivoted toward one another in order to enhance the efficiency of the transmission of acoustic signals and the receipt of such signals by the respective transducers. For example, the ultrasonic transducer 755-A may be rotated or pivoted toward the ultrasonic transducer 755-B in order to transmit an acoustic signal toward the ultrasonic transducer 755-B, and to receive an acoustic signal from the ultrasonic transducer 755-B. Then, the ultrasonic transducer 755-A may be rotated or pivoted toward the ultrasonic transducer 755-C in order to transmit an acoustic signal toward the ultrasonic transducer 755-C, and to receive an acoustic signal from the ultrasonic transducer 755-C. Next, the ultrasonic transducer 755-B and the ultrasonic transducer 755-C may be aligned toward one another, and acoustic signals may be transmitted by and received from the respective transducers. Elapsed times between the transmissions of acoustic signals and the receipts of the acoustic signals by and between the respective transducers may be used to determine air speeds along the paths or axes extending between the respective transducers.

Figure 11A:
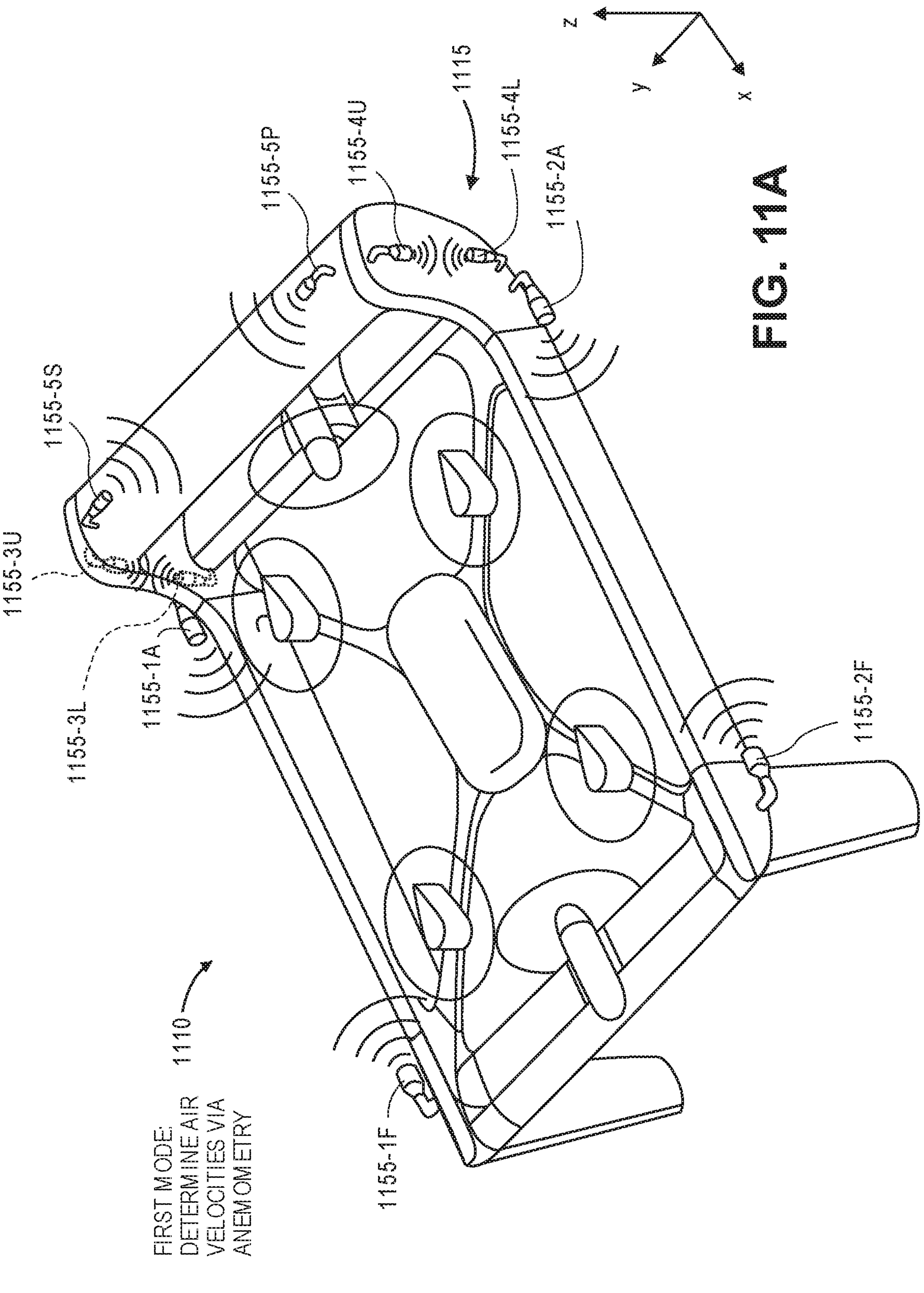
FIGS. 11A and 11B are views of an aerial vehicle having an airframe with ultrasonic transducers embedded therein in accordance with embodiments of the present disclosure.
Figure 11B:
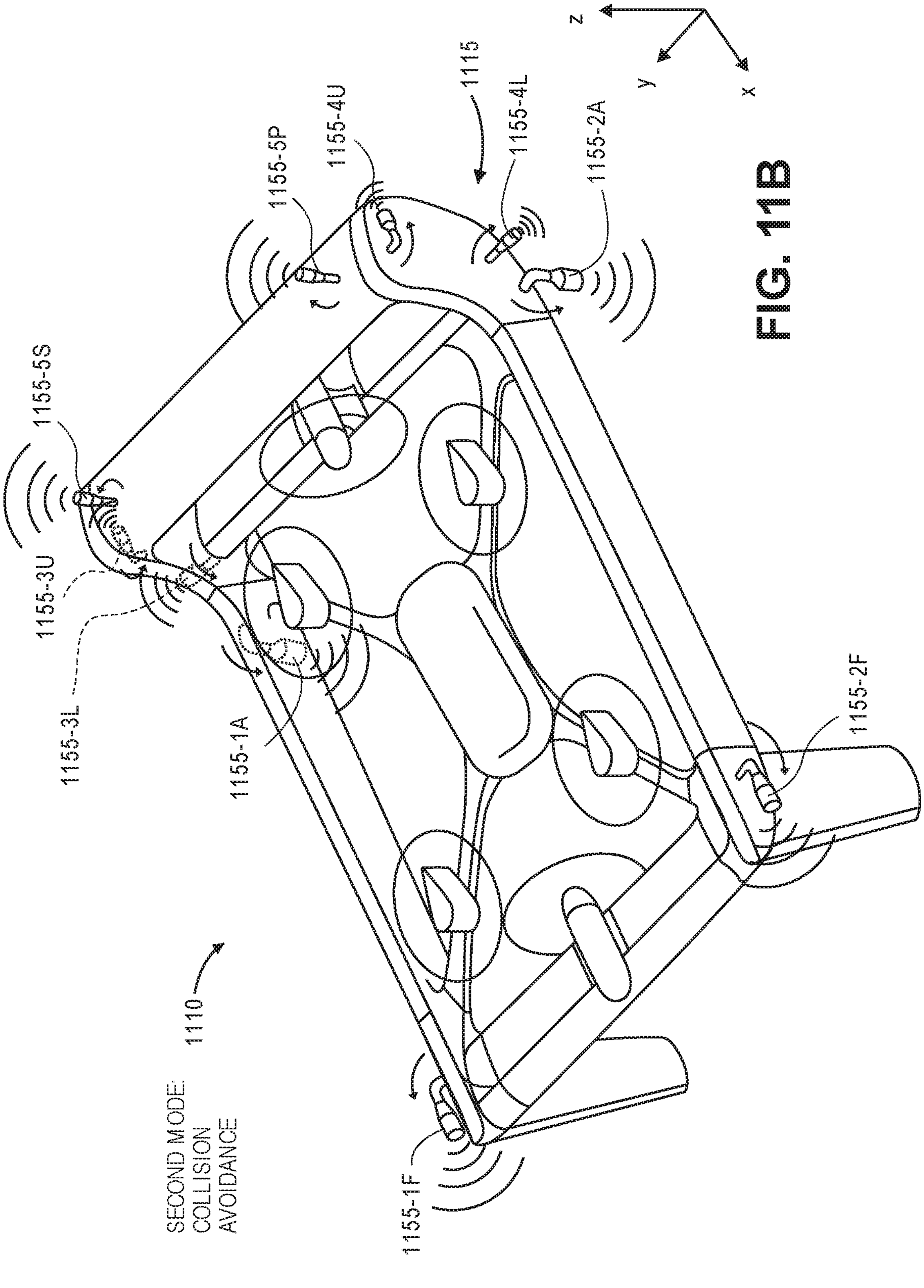

Additionally, transducers that may be reconfigured, reoriented, rotated, repositioned or pivoted in accordance with the present disclosure may be operated in two or more different modes. Referring to FIGS. 11A and 11B, views of an aerial vehicle having an airframe with ultrasonic transducers embedded therein in accordance with embodiments of the present disclosure are shown. Except where otherwise noted, reference numerals preceded by the number "10" shown in FIGS. 10A and 10B indicate components or features that are similar to components or features having similar reference numerals preceded by the number "10" shown in FIGS. 10A and 10B, by the number "9" shown in FIGS. 9A and 9B, by the number "7" shown in FIGS. 7A through 7D, by the number "6" shown in FIGS. 6A through 6C, by the number "5" shown in FIG. 5, by the number "4" shown in FIG. 4, by the number "2" shown in FIG. 2 or by the number "1" shown in FIGS. 1A through 1C.

As is shown in FIG. 11A and FIG. 11B, an aerial vehicle 1110 includes an airframe 1115 having a plurality of transducers mounted thereto, including a forward transducer 1155-1F and an aft transducer 1155-1A that are each fixed to the airframe 1115 on a starboard side of the aerial vehicle 1110, a forward transducer 1155-2F and an aft transducer 1155-2A that are each fixed to the airframe 1115 on a port side of the aerial vehicle 1110, an upper transducer 1155-3U and a lower transducer 1155-3L that are each fixed to the airframe 1115 on the starboard side of the aerial vehicle 1110, an upper transducer 1155-4U and a lower transducer 1155-4L that are each fixed to the airframe 1115 on the port side of the aerial vehicle 1110, and a port transducer 1155-5P and a starboard transducer 1155-5S that are each fixed above a control surface in an aft region of the aerial vehicle 1110.

As is shown in FIG. 11A, the transducers of the aerial vehicle 1110 may be operated in a first mode, i.e., to determine velocities of air passing above, below or around the aerial vehicle 1110. For example, the forward transducer 1155-1F and the aft transducer 1155-1A are aligned along a common axis and in opposite directions with respect to one another. Elapsed times between the transmission and receipt of acoustic signals by the forward transducer 1155-1F and the aft transducer 1155-1A may be used to determine air speeds along the common axis between the forward transducer 1155-1F and the aft transducer 1155-1A, e.g., along the starboard side of the aerial vehicle 1110. Similarly, the forward transducer 1155-2F and the aft transducer 1155-2A, the upper transducer 1155-3U and the lower transducer 1155-3L, the upper transducer 1155-4U and the lower transducer 1155-4L and the port transducer 1155-5P and the starboard transducer 1155-5S are each aligned along common axes and in opposite directions with respect to one another. Air speeds along such axes may be determined based on elapsed times between the transmissions and receipts of acoustic signals by pairs of such transducers.

As is shown in FIG. 11B, any of the transducers may be utilized by the aerial vehicle 1110 during the performance of multiple purposes or functions, and may be rotated or pivoted about axes defined by their respective mounts or reconfigured as necessary in order to perform such purposes or functions, or to operate in a second mode, such as collision avoidance. For example, as is shown in FIG. 11B, each of the forward transducers 1155-1F, 1155-2F may be rotated by one hundred eighty degrees (180°) and oriented in order to transmit acoustic signals or energy in a forward direction in order to identify any objects (e.g., other aerial vehicles, as well as trees or structures) that may be present forward of the aerial vehicle 1110. Similarly, each of the aft transducers 1155-1A, 1155-2A may be rotated by ninety degrees (90°) and oriented to transmit acoustic signals or energy in a downward direction in order to identify any objects (e.g., other aerial vehicles, as well as landing surfaces) that may be present below the aerial vehicle 1110. The upper transducers 1155-3U, 1155-4U, the port transducer 1155-5P and the starboard transducer 1155-5S may each be rotated by ninety degrees (90°) and oriented to transmit acoustic signals or energy in an upward direction in order to identify any objects (e.g., other aerial vehicles) that may be present above the aerial vehicle 1110. The lower transducers 1155-3L, 1155-4L may be rotated by ninety degrees (90°) and oriented to transmit acoustic signals or energy in lateral directions in order to identify any objects that may be present on either side of the aerial vehicle 1110.

The aerial vehicle 1110 may be configured to alternate modes of operation, e.g., between the first mode shown in FIG. 11A and the second mode shown in FIG. 11B, in accordance with a predetermined schedule or sequence, which may be defined or limited only by the abilities or capacities of the respective transducers 1155-1F, 1155-1A, 1155-2F, 1155-2A, 1155-3U, 1155-3L, 1155-4U, 1155-4L, 1155-5P, 1155-5S to be repositioned about their respective axes or to desired angles of orientation.

Figure 12:
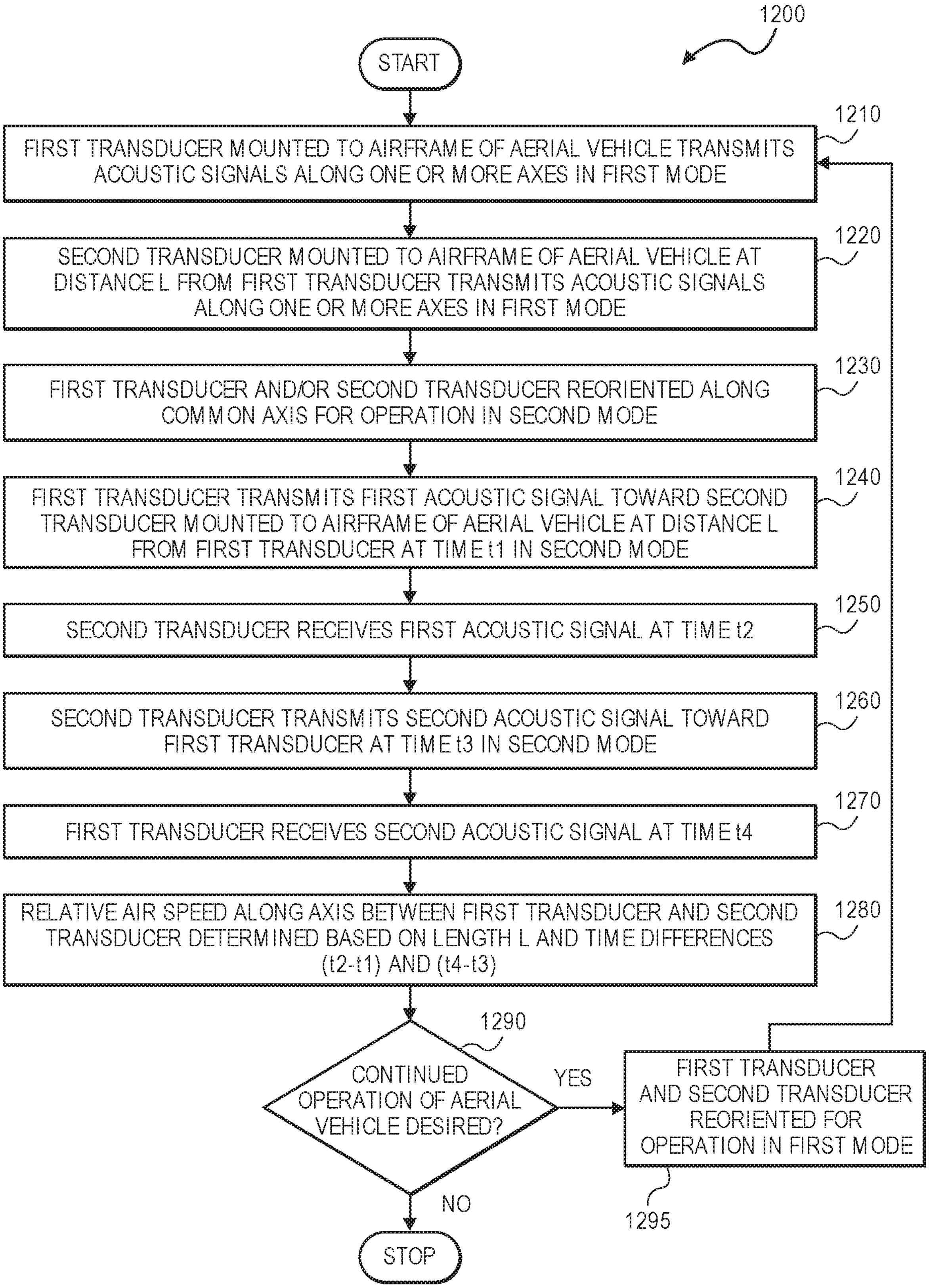
FIG. 12 is a flow chart of one process for operating an aerial vehicle having ultrasonic transducers embedded into an airframe in accordance with embodiments of the present disclosure.

Referring to FIG. 12, a flow chart 1200 of one process for operating an aerial vehicle having ultrasonic transducers embedded into an airframe in accordance with embodiments of the present disclosure is shown. At box 1210, a first transducer mounted to an airframe of an aerial vehicle transmits acoustic signals along one or more axes in a first mode, and at box 1220, a second transducer mounted to the airframe at a distance L from the first transducer transmits acoustic signals along the one or more axes in the first mode. For example, the transducers may be aligned in any number of directions and utilized to transmit (or receive) acoustic signals within predetermined frequency spectra (or bands), at predetermined intensity levels, for predetermined durations, or at predetermined times for any purpose. In some embodiments, information or data regarding the transmission and receipt of acoustic signals by the first transducer and/or the second transducer may be used to determine a distance to an object (e.g., an airborne or ground-based object that is stationary or in motion), to recognize the object, or to determine or assess a level of risk that the aerial vehicle may collide with the object, or for any other purpose. For example, elapsed times between the transmission and receipt of an acoustic signal (e.g., a time of flight) along a given axis by one of the transducers may be used to determine that an object is present along the given axis, a range to the object, or a position and/or velocity of the object, in the absence of contact with the object, and regardless of any colors or other surface textures of the object. Transmissions and receipts of a plurality of acoustic signals may be interpreted in order to define a depth profile of the object based on the elapsed times of such signals. The frequencies, intensities, durations or other characteristics of the acoustic signals may be selected on any basis.

At box 1230, the first transducer and the second transducer are reoriented along a common axis for operation in a second mode, e.g., an ultrasonic anemometry mode. For example, referring again to FIG. 11A, pairs of transducers may be oriented toward one another, e.g., by one or more motors, hinges or like components, about axes defined by their respective mounts to the airframe of the aerial vehicle. At box 1240, the first transducer transmits a first acoustic signal toward the second transducer at a time $t_1$ in the second mode, and at box 1250, the second transducer receives the first acoustic signal at a time $t_2$. The first acoustic signal may be transmitted at any frequency or intensity, and for any duration, and may include beams, pluses or bursts thereof. At box 1260, the second transducer transmits a second acoustic signal toward the first transducer at a time $t_3$ in the second mode, and at box 1270, the first transducer receives the second acoustic signal at a time $t_4$. In some embodiments, the second acoustic signal may be transmitted at the same frequency or intensity, or for the same duration, as the first acoustic signal. Alternatively, in other embodiments, the second acoustic signal may be transmitted at a frequency or an intensity, or for a duration, that is different from the frequency, intensity or duration of the first acoustic signal.

At box 1280, a relative air speed along an axis between the first transducer and the second transducer is determined based on the distance L and the differences in time $(t_2-t_1)$ and time $(t_4-t_3)$. As is discussed above, using the distance between the transducers and the values of the times $t_1$, $t_2$, $t_3$, $t_4$, Equation (3), above, may be used to solve for an air speed in the direction between the first transducer and the second transducer.

At box 1290, whether the continued operation of the aerial vehicle is desired is determined. If the continued operation of the aerial vehicle is desired, then the process advances to box 1295, where the first transducer and the second transducer are reoriented for operation in the first mode, before returning to box 1210 and box 1220, where the first transducer and the second transducer transmit acoustic signals along one or more axes in the first mode. If the continued operation of the aerial vehicle is no longer desired, however, then the process ends.

The orientation and reorientation of the transducers of the present disclosure may occur on any basis or in accordance with any schedule. For example, the transducers may be oriented and reoriented in an alternating fashion, such that the transducers change their respective modes of operation or angle of orientation with each acoustic signal. Alternatively, the transducers may be oriented and reoriented in accordance with a given schedule, such that the transducers operate in specific modes or are aligned in specific angles of orientation for predetermined periods of time. Moreover, the transducers of the present disclosure may be reoriented or reconfigured in any manner in accordance with the present disclosure, e.g., consistent with one or more degrees of freedom of a transducer. For example, the transducers may be rotated or pivoted in any direction, about any axis, and to any extent, such as is shown in FIGS. 10A and 10B. Alternatively, a transducer may be configured to translate within airframes of aerial vehicles, e.g., along or within tracks or rails disposed on outer surfaces of such airframes, as needed, in order to cause the transducer to be positioned in a desired location consistent with an intended mode of operation.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

As used herein, the terms "forward" flight or "horizontal" flight refer to flight in a direction substantially parallel to the ground (i.e., sea level). As used herein, the term "vertical" flight refers to flight in a direction extending substantially radially outward from a center of the Earth. Those of ordinary skill in the pertinent arts will recognize that flight trajectories may include components of both "forward" flight or "horizontal" flight and "vertical" flight vectors.

Although some of the embodiments disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3, 7 or 12, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An aerial vehicle comprising:
- an airframe;
- a first ultrasonic transducer rotatably mounted to a first location on the airframe by a first mount, wherein the first ultrasonic transducer is configured to rotate about a first axis defined by the first mount;
- a second ultrasonic transducer mounted to a second location on the airframe by a second mount, wherein the first location and the second location are separated by a first linear distance along a first path; and
- a control unit having at least one computer processor configured to at least:
  - cause the first ultrasonic transducer to be aligned toward the second ultrasonic transducer along the first path;
  - cause the first ultrasonic transducer to transmit a first acoustic signal toward the second ultrasonic transducer along the first path at a first time;
  - capture first acoustic energy by the second ultrasonic transducer at a second time, wherein the first acoustic energy comprises the first acoustic signal;
  - cause the second ultrasonic transducer to transmit a second acoustic signal toward the first ultrasonic transducer along the first path at a third time;
  - capture second acoustic energy by the first ultrasonic transducer at a fourth time, wherein the second acoustic energy comprises the second acoustic signal; and
  - determine a first elapsed time based at least in part on a difference between the second time and the first time;
  - determine a second elapsed time based at least in part on a difference between the fourth time and the third time; and
  - determine a first air speed along the first path based at least in part on the first linear distance, the first elapsed time and the second elapsed time.

2. The aerial vehicle of claim 1, wherein the first air speed is a product of one-half the first linear distance and a difference between a reciprocal of the second elapsed time and a reciprocal of the first elapsed time.

3. The aerial vehicle of claim 1, wherein the control unit is further configured to at least:
- cause one of the first transducer or the second transducer to transmit a third acoustic signal along a second path at a fifth time;
- capture third acoustic energy by the one of the first transducer or the second transducer at a sixth time, wherein the third acoustic energy comprises the third acoustic signal;
- determine a third elapsed time based at least in part on a difference between the sixth time and the fifth time; and
- determine at least one of a position of a first object or a velocity of the first object based at least in part on the third elapsed time.

4. The aerial vehicle of claim 1, further comprising:
- a third transducer mounted to a third location on the airframe by a third mount, wherein the third location and the first location are separated by a second linear distance along a second path, and wherein the at least one computer processor is further configured to at least:

cause the third ultrasonic transducer to transmit a third acoustic signal toward the first ultrasonic transducer along the second path at a fifth time;

capture third acoustic energy by the first ultrasonic transducer at a sixth time, wherein the third acoustic energy comprises the third acoustic signal;

cause the first ultrasonic transducer to transmit a fourth acoustic signal toward the third ultrasonic transducer along the second path at a seventh time;

capture fourth acoustic energy by the third ultrasonic transducer at an eighth time, wherein the fourth acoustic energy comprises the fourth acoustic signal; and determine a third elapsed time based at least in part on a difference between the sixth time and the fifth time;

determine a fourth elapsed time based at least in part on a difference between the eighth time and the seventh time; and determine a second air speed along the second path based at least in part on the second linear distance, the third elapsed time and the fourth elapsed time.

5. The aerial vehicle of claim 4, further comprising at least one of a propulsion motor or a movable control surface, wherein the at least one computer processor is further configured to at least:

determine a net vector representative of an air velocity of the aerial vehicle based at least in part on the first air speed, the first path, the second air speed and the second path;

identify at least one of a desired course, a desired speed or a desired altitude for the aerial vehicle; and operate the at least one of the propulsion motor or the movable control surface based at least in part on the air velocity to cause the aerial vehicle to travel at the at least one of the desired course, the desired speed or the desired altitude.

6. A method comprising:

transmitting, by a first transducer, a first acoustic signal in at least a first direction along at least a first path at a first time, wherein the first transducer is mounted to a first portion of an aerial vehicle, and wherein the first transducer is configured to rotate about an axis normal to the first portion of the aerial vehicle;

receiving, by a second transducer, at least the first acoustic signal at a second time, wherein the second transducer is mounted to a second portion of the aerial vehicle, and wherein the second transducer and the first transducer are separated by a first linear distance;

determining a first elapsed time of the first acoustic signal, wherein the first elapsed time comprises a difference between the second time and the first time; and determining a relative air speed along the first path based at least in part on the first linear distance and the first elapsed time.

7. The method of claim 6, wherein determining the relative air speed along the first path comprises:

transmitting, by the second transducer, a second acoustic signal in at least a second direction along the first path at a third time, wherein the second direction is opposite to the first direction;

receiving, by the first transducer, the second acoustic signal at a fourth time; and determining a second elapsed time of the second acoustic signal, wherein the second elapsed time comprises a difference between the fourth time and the third time, and wherein the relative air speed along the first path is determined based at least in part on the first linear distance, the first elapsed time and the second elapsed time.

8. The method of claim 7, wherein the relative air speed along the first path is determined according to a formula $$v = \frac{L}{2}\left(\frac{1}{\Delta t_2} - \frac{1}{\Delta t_1}\right)$$

wherein v is the relative air speed, wherein L is the first linear distance, wherein $\Delta t_1$ is the first elapsed time, and wherein $\Delta t_2$ is the second elapsed time.

9. The method of claim 6, wherein the first transducer is operating in an ultrasonic anemometry mode at the first time, and wherein the method further comprises:

causing the first transducer to be aligned along at least a second path, wherein the second path is not the first path; and transmitting, by the first transducer, a second acoustic signal in at least a second direction along at least the second path at a third time, wherein the first transducer is operating in at least one of a collision avoidance mode, a depth ranging mode, or an object recognition mode at the third time.

10. The method of claim 9, further comprising:

receiving, by the first transducer, at least the second acoustic signal at a fourth time; and determining a second elapsed time of the second acoustic signal, wherein the second elapsed time comprises a difference between the fourth time and the third time.

11. The method of claim 10, further comprising:

determining, based at least in part on the second elapsed time, at least one of:

a second linear distance from the first transducer to an object along the second path;

a position of the object;

a velocity of the object; or a risk of collision with the object by the aerial vehicle.

12. The method of claim 6, further comprising:

causing the first transducer to be aligned along at least a second path, wherein the second path is not the first path;

transmitting, by the first transducer, a second acoustic signal in at least a second direction along at least the second path at a third time;

receiving, by a third transducer, at least the second acoustic signal at a fourth time, wherein the third transducer is mounted to a third portion of the aerial vehicle, and wherein the third transducer and the first transducer are separated by a second linear distance;

determining a second elapsed time of the second acoustic signal, wherein the second elapsed time comprises a difference between the third time and the first time; and determining a relative air speed along the second path based at least in part on the second linear distance and the second elapsed time.

13. The method of claim 12, wherein the first transducer is mounted to the first portion of the aerial vehicle by a motorized mount configured to rotate the at least a portion of the first transducer about the axis, and wherein causing the first transducer to be aligned along at least the second path comprises:

rotating, by the motorized mount, the portion of the first transducer about the axis by a predetermined angle between the first path and the second path.

14. The method of claim 6, wherein the first path is parallel or coaxial to one of:

a longitudinal axis of the aerial vehicle;

a lateral horizontal axis of the aerial vehicle; or a vertical axis of the aerial vehicle.

15. The method of claim 6, further comprising:

identifying at least one of a desired course for the aerial vehicle, a desired speed of the aerial vehicle or a desired altitude of the aerial vehicle;

generating at least one control signal for operating the aerial vehicle at the at least one of the desired course, the desired speed or the desired altitude or the desired orientation based at least in part on the relative air speed along the first path; and causing at least one of a propulsion motor of the aerial vehicle or a control surface of the aerial vehicle to operate in accordance with the at least one control signal.

16. The method of claim 6, wherein the first acoustic signal comprises a first pulse at a first frequency of at least twenty kilohertz and for a first duration of under one millisecond, and wherein the second acoustic signal comprises a second pulse at a second frequency of at least twenty kilohertz and for a second duration of under one millisecond.

17. The method of claim 6, further comprising:

establishing a sampling pattern for transmitting acoustic signals by the first transducer, wherein the sampling pattern comprises at least one of:

a predetermined frequency spectrum;

a predetermined intensity; or a predetermined duration, and wherein the first acoustic signal is transmitted in accordance with the sampling pattern.

18. A vehicle comprising:

a first transducer rotatably mounted to a first portion of the vehicle, wherein the first transducer comprises a first induction motor, a first transmitter and a first receiver, wherein the first induction motor is configured to rotate the first transmitter about a first axis, wherein the first transmitter is configured to transmit acoustic energy at frequencies of at least twenty kilohertz in a first direction defined by a first angle of the first transmitter about the first axis, and wherein the first receiver is configured to receive acoustic energy at frequencies of at least twenty kilohertz.

19. The vehicle of claim 18, further comprising:

a second transducer rotatably mounted to a second portion of the vehicle;

wherein the second transducer comprises a second induction motor, a second transmitter and a second receiver, wherein the second induction motor is configured to rotate the second transmitter about a second axis, wherein the second transmitter is configured to transmit acoustic energy at frequencies of at least twenty kilohertz in a second direction defined by a second angle of the second transmitter about the second axis;

wherein the second receiver is configured to receive acoustic energy at frequencies of at least twenty kilohertz, and wherein the second portion of the vehicle is separated from the first portion of the vehicle by a predetermined linear distance along a path; and a control system having at least one computer processor, wherein the control system is configured to at least:

determine an airspeed along the path based at least in part on a first elapsed time between a transmission of a first acoustic signal by a first one of the first transducer or the second transducer and a receipt of the first acoustic signal by a second one of the first transducer or the second transducer.

20. The vehicle of claim 19, wherein the control system is further configured to at least:

determine a distance to an object based at least in part on a second elapsed time between a transmission of a second acoustic signal by a third one of the first transducer or the second transducer and a receipt of the second acoustic signal by the third one of the first transducer or the second transducer.

* * * * *